United States Patent
Kawano et al.

(10) Patent No.: US 7,502,100 B2
(45) Date of Patent: Mar. 10, 2009

(54) THREE-DIMENSIONAL POSITION MEASUREMENT METHOD AND APPARATUS USED FOR THREE-DIMENSIONAL POSITION MEASUREMENT

(75) Inventors: Toshio Kawano, Sakai (JP); Masayuki Yamada, Toyonaka (JP)

(73) Assignee: Konica Minolta Sensing, Inc., Sakai-Shi (JP)

( * ) Notice: Subject to any disclaimer, the term of this patent is extended or adjusted under 35 U.S.C. 154(b) by 328 days.

(21) Appl. No.: 11/446,868

(22) Filed: Jun. 5, 2006

(65) Prior Publication Data

US 2006/0274329 A1  Dec. 7, 2006

(30) Foreign Application Priority Data

Jun. 7, 2005  (JP) .............................. 2005-167296

(51) Int. Cl.
G01B 11/26 (2006.01)
G01B 11/30 (2006.01)

(52) U.S. Cl. ............... 356/138; 356/139.07; 356/141.1; 356/603; 356/607; 356/364

(58) Field of Classification Search ................. 356/603, 356/607, 608, 138, 138.07, 141.1–141.4, 356/364; 250/559.22
See application file for complete search history.

(56) References Cited

U.S. PATENT DOCUMENTS 5,444,537 A * 8/1995 Yoshimura et al. .......... 356/603

7,119,911 B2 * 10/2006 Tyczka et al. ............... 356/603

FOREIGN PATENT DOCUMENTS

| JP | 02-184705 | 6/1990 |
|----|-----------|--------|
| JP | 06-137826 | 5/1994 |
| JP | 2000-097631 | 4/2000 |

* cited by examiner

*Primary Examiner*—L. G Lauchman
(74) *Attorney, Agent, or Firm*—Sidley Austin LLP

(57) ABSTRACT

In three-dimensional measurement where circular polarized light or elliptical polarized light is projected as measurement light, correct measurement results can be obtained irrespective of the difference in intensity between primary reflected light and secondary reflected light. A three-dimensional position measurement method includes projecting, as the measurement light, circular polarized light or elliptical polarized light onto an object to be measured, photoelectrically converting reflected light from the object to obtain a first signal, allowing the reflected light from the object to enter a quarter wavelength plate, allowing reflected light that has passed through the quarter wavelength plate to enter a polarizing device attenuating secondary reflected light that is light reflected from the object twice, photoelectrically converting reflected light that has passed through the polarizing device to obtain a second signal, and removing secondary reflected light components by using a difference between the first signal and the second signal.

14 Claims, 18 Drawing Sheets

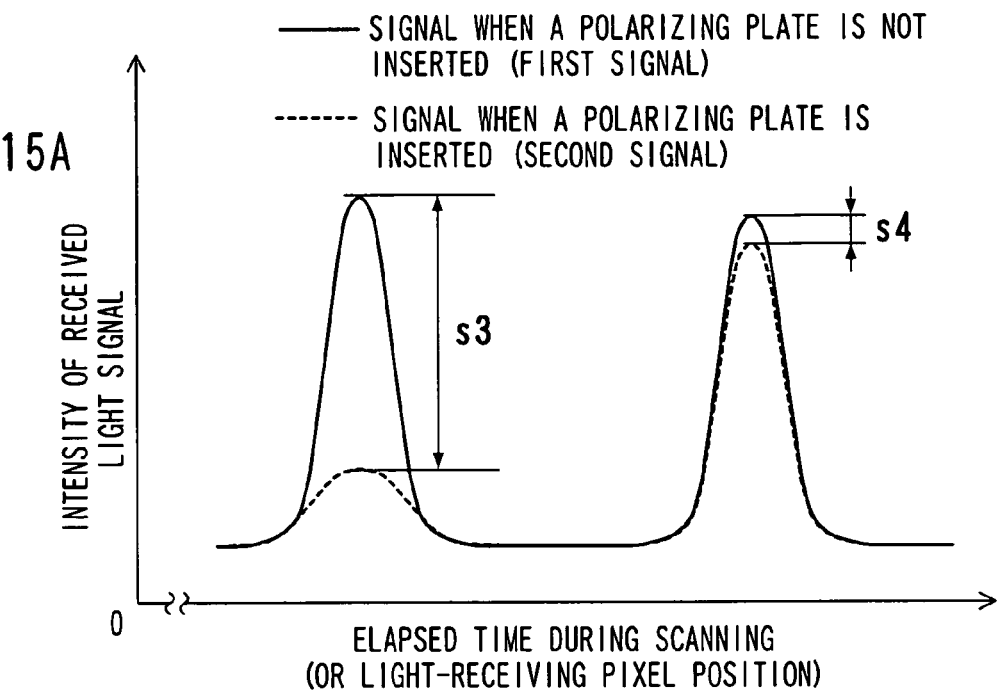
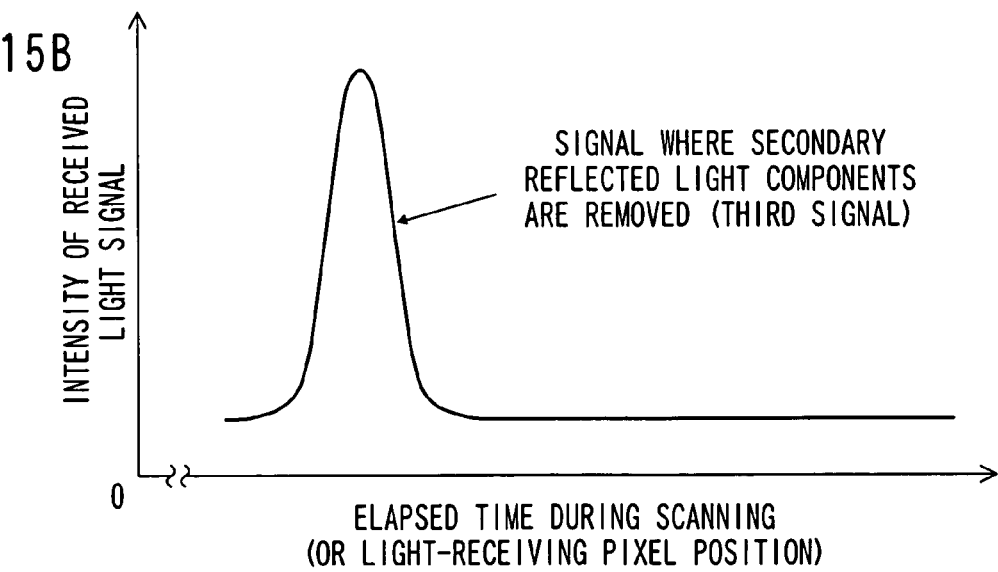

THREE-DIMENSIONAL POSITION MEASUREMENT METHOD AND APPARATUS USED FOR THREE-DIMENSIONAL POSITION MEASUREMENT

This application is based on Japanese Patent Application No. 2005-167296 filed on Jun. 7, 2005, the contents of which are hereby incorporated by reference.

BACKGROUND OF THE INVENTION 1.1 Field of the Invention

The present invention relates to a three-dimensional position measurement method for projecting measurement light onto an object to measure a position of an irradiated portion of the object and to an apparatus used for the three-dimensional position measurement.

2. Description of the Related Art

Non-contact three-dimensional input devices called rangefinders are used for data entry into CAD systems or CG systems, three-dimensional measurement of various types of articles or bodies, visual recognition for robots and others. The three-dimensional input device of this type projects measurement light onto an object to photograph the same, and then to output three-dimensional position information of plural points on the object. On this occasion, three-dimensional positions of the respective points are determined by operations based on the triangulation method.

The operations based on the triangulation method use the following three pieces of information.

(1) Projection angle of measurement light
(2) Acceptance angle of reflected light from an object
(3) Positional relationship between a projection optical system and a receiving optical system In order to obtain the correct coordinates of a certain point on the object, with respect to the point, it is necessary that the items (1) and (2) correspond to each other one-to-one. The case where only measurement light reflected from the point on the object is received is the one-to-one relationship.

There are often instances when, in addition to measurement light reflected from a certain point on an object (hereinafter referred to as "primary reflected light"), measurement light that was reflected from the point and further reflected from another point on the object (hereinafter referred to as "secondary reflected light") is received. In such a case, two acceptance angles correspond to one projection angle. Unless an operation is performed using the acceptance angle of the primary reflected light, which is true information, of the two acceptance angles, the correct coordinates cannot be determined.

Japanese unexamined patent publication No. 2-184705 is a related art document that is directed to problems of the secondary reflected light as described above. The document describes a method using a property that a rotation direction of circular polarized light is reversed every time when the circular polarized light is reflected. More specifically, the document describes a method of projecting the circular polarized light on an object as measurement light and passing the light reflected from the object through a quarter wavelength plate and a polarizing plate in this order. The quarter wavelength plate converts the circular polarized light to linear polarized light. At this time, the quarter wavelength plate makes the polarization direction of primary reflected light orthogonal to the polarization direction of secondary reflected light. The polarizing plate is arranged so as to transmit the primary reflected light mainly, thereby to provide the effect of attenuating the secondary reflected light. According to the disclosure of the document, a received light signal where secondary reflected light components are removed is generated by using only one received light signal obtained by photoelectric conversion of the light that has passed through the polarizing plate. On this occasion, the primary reflected light components and the secondary reflected light components are distinguished from each other on the premise that the intensity of the primary reflected light is higher than that of the secondary reflected light.

U.S. Pat. No. 5,444,537 describes a method of projecting a plurality of light beams modulated into different patterns to determine the intensity ratio of the beams, and thereby to remove secondary reflected light components from a received light signal.

With the conventional method of projecting circular polarized light, correct measurement results are not always obtained, unless the intensity of the primary reflected light is sufficiently higher than that of the secondary reflected light. In practical cases, even if the secondary reflected light is attenuated using the combination of the quarter wavelength plate and the polarizing plate, the intensity of the secondary reflected light may be greater than that of the primary reflected light or there may be little difference in the intensity between the secondary reflected light and the primary reflected light. For example, there may be instances when the primary reflected light is weak diffused light and the secondary reflected light is strong light that was regularly reflected from an object twice. In such a case, the primary reflected light components rather than the secondary reflected light components may be removed from the received light signal by mistake. The removal of the primary reflected light components results in calculation of the incorrect coordinates.

Meanwhile, with the method of projecting a plurality of light beams modulated into different patterns, a projection optical system becomes complicated and expensive.

SUMMARY OF THE INVENTION

The present invention is directed to solve the problem pointed out above, and therefore, an object of the present invention is, in three-dimensional measurement in which circular polarized light or elliptical polarized light is used as measurement light for projection, to definitely determine correct measurement results irrespective of the difference in intensity between primary reflected light and secondary reflected light.

According to one example of a three-dimensional measurement method achieving the object described above, two types of light are photoelectrically converted respectively to obtain two signals. Then, signal processing using the two signals is performed and secondary reflected light components are removed from one of the two signals and thereby to generate a signal.

A set of signals to be obtained includes a set of a first signal and a second signal. The first signal is obtained by photoelectric conversion of light reflected from an object to be measured without positively attenuating primary reflected light and secondary reflected light included in the reflected light from the object. The second signal is obtained by photoelectric conversion of light reflected from the object to be measured after selectively attenuating secondary reflected light or primary reflected light included in the reflected light from the object. When this set of signals is obtained, a third signal where secondary reflected light components are removed can be generated by one of the following: 1. Signal processing of extracting from the first signal a signal value in which the absolute value of a difference from the second signal is smaller than a set value. 2. Signal processing of extracting from the second signal a signal value in which the absolute value of a difference from the first signal is smaller than a set value.

Further, the set of signals to be obtained includes a set of a first signal and a second signal. The first signal is obtained by photoelectric conversion of light reflected from an object to be measured after selectively attenuating primary reflected light of the reflected light from the object. The second signal is obtained by photoelectric conversion of light reflected from the object after selectively attenuating secondary reflected light of the reflected light from the object. When this set of signals is obtained, a signal where secondary reflected light components are removed can be generated by signal processing of extracting from the second signal a signal value larger than the first signal.

In either set, an optical system for splitting reflected light and two photoelectric detectors can be used to obtain the first signal and the second signal concurrently. Further, the timing of projection and acceptance of measurement light for obtaining the first signal can differ from the timing of projection and acceptance of measurement light for obtaining the second signal. In such a case, at least, a signal that has been obtained first is stored in a memory.

With the structure described above, in three-dimensional measurement where influences due to secondary reflection are reduced by using a property that a rotation direction of circular polarized light is reversed by reflection, correct measurement results can be obtained irrespective of the difference in intensity between primary reflected light and secondary reflected light.

These and other characteristics and objects of the present invention will become more apparent by the following descriptions of preferred embodiments with reference to drawings.

BRIEF DESCRIPTION OF THE DRAWINGS

FIGS. 15A and 15B show the principles of signal processing according to the fifth embodiment.

DESCRIPTION OF THE PREFERRED EMBODIMENTS

Hereinafter, embodiments of the present invention will be described.

First Embodiment

In the first embodiment, operation of optically scanning an object to be measured is performed twice, and thereby to obtain a first signal and a second signal that are to be compared with each other in order to generate a signal where secondary reflected light components are removed.

Figure 1:
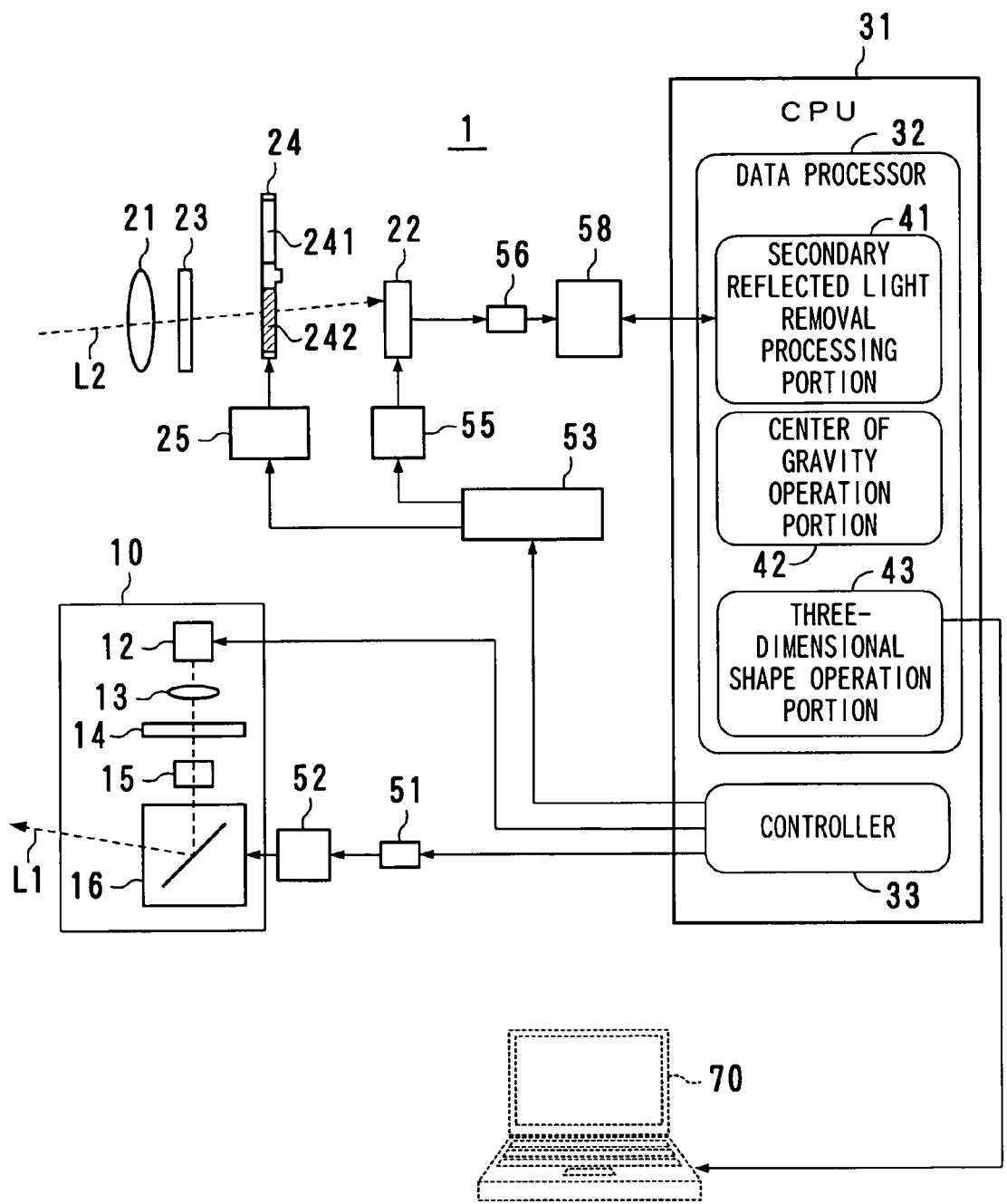
FIG. 1 is a diagram showing a configuration of a three-dimensional position measurement apparatus according to a first embodiment.

FIG. 1 is a diagram showing a configuration of a three-dimensional position measurement apparatus 1 according to the first embodiment.

The three-dimensional position measurement apparatus 1 measures a shape of an object to be measured (not shown) by a widespread slit light projection method. The measurement results are transmitted to an external computer 70 online or offline.

The three-dimensional position measurement apparatus 1 includes a light-projecting portion 10 for projecting measurement light L1 that is circular polarized light onto the object to be measured. The light-projecting portion 10 includes a laser-generating portion 12, a collimator lens 13, a quarter wavelength plate 14, a cylindrical lens 15 and a galvano scanner 16.

The laser-generating portion 12 has a laser diode as a light source and emits laser light that is linear polarized light. The collimator lens 13 shapes the laser light into parallel light. The quarter wavelength plate 14 converts the laser light that has been shaped into the parallel light into circular polarized light. The cylindrical lens 15 extends a beam cross section of the laser light that has been converted into the circular polarized light in the direction orthogonal to an optical axis. The galvano scanner 16 emits, as the measurement light L1, the laser light (the circular polarized light) that has become slit light with the cylindrical lens 15. The galvano scanner 16 includes a galvano mirror driven by a scanner driver 52 and can change the projection angle of the measurement light L1 within a range of a rotation angle of the galvano mirror.

The measurement light L1 projected by the light-projecting portion 10 is reflected from the object to be measured. A part of the measurement light L1 thus reflected returns to the three-dimensional position measurement apparatus 1 as reflected light L2.

The reflected light L2 passes through a light-receiving lens 21 for imaging, a quarter wavelength plate 23 for converting circular polarized light to linear polarized light and a rotating filter 24 for obtaining two kinds of signals in this order and then enters an area sensor 22.

The rotating filter 24 is a movable filter mechanism. The rotating filter 24 has a rotator for supporting a glass plate 241 and a polarizing plate 242 and interposes the glass plate 241 or the polarizing plate 242 in the optical path between the quarter wavelength plate 23 and the area sensor 22. The rotating filter 24 is driven by a drive unit 25 containing a motor therein.

The area sensor 22 is a two-dimensional imaging device having a light-receiving surface made up of CCD (Charge Coupled Devices). The area sensor 22 operates in accordance with clocks supplied from a drive circuit 55 to output a photoelectric conversion signal indicating intensity of received light in each pixel on the light-receiving surface.

An A/D converter 56 converts the output from the area sensor 22 into digital received light data having a predetermined bit. The received light data are temporarily stored in the memory 58 and are loaded into a CPU (Central processing Unit) 31.

The CPU 31 includes a microcomputer and peripheral devices necessary for the operation thereof. The CPU 31 functions as a data processor 32 operating to perform signal processing and a controller 33 operating to control optical scan. Each of the data processor 32 and the controller 33 is made up of hardware including an input/output port and software including programs.

The data processor 32 includes a secondary reflected light removal processing portion 41, a center of gravity operation portion 42 and a three-dimensional shape operation portion 43. The secondary reflected light removal processing portion 41 is a characteristic functional element and performs the signal processing described later. The center of gravity operation portion 42 performs a known center of gravity operation for determining the center of gravity of temporal or spatial sampling data in order to enhance the measurement resolution. The three-dimensional shape operation portion 43 calculates coordinates of measurement points on the object to be measured based on a set of a projection angle and an acceptance angle determined by the center of gravity operation. Each of the secondary reflected light removal processing portion 41, the center of gravity operation portion 42 and the three-dimensional shape operation portion 43 may be structured by independent hardware, as a function to be given to the CPU or by the combination thereof.

The controller 33 controls the laser-generating portion 12 and the scanner driver 52. The controller 33 gives instructions to the scanner driver 52 through a D/A converter 51. The controller 33 also gives instructions to an imaging controller 53 for controlling the drive unit 25 and the drive circuit 55.

The following are descriptions of the basic operation of the three-dimensional position measurement apparatus 1 structured as described above and an outline of measurement by the slit light projection method.

While the projection angle of the measurement light L1 is changed at a constant rate, the object to be measured on which an irradiated position is changed every moment is photographed at a constant period. Each frame image thus photographed has emission lines each of which shows a portion irradiated with slit light. Unless an irradiated surface of the object is flat, the emission line bends depending on the irregularities of the object surface. If the positional relationship between the light-receiving surface of the area sensor 22 and the light-receiving lens 21 is known, an incident angle of light entering each pixel on the light-receiving surface, i.e., an acceptance angle for each pixel position is also known. Further, if the temporal relationship between light projection and image capturing is known, a projection angle at image capturing time of each frame is known. Thus, basically, pixels corresponding to an emission line in each frame are checked, so that a set of a projection angle and an acceptance angle necessary for a triangulation operation is determined. In principle, positions of points of the same number as the number of pixels in one column on the light-receiving surface are determined from one frame.

A center of gravity operation is performed to determine a set of a projection angle and an acceptance angle. The center of gravity operation includes a spatial center of gravity operation and a temporal center of gravity operation.

The spatial center of gravity operation is an operation for determining, based on received light data of plural pixels arranged in the width direction of an emission line, the luminance center in the slit width direction on the light-receiving surface when slit light enters. This operation eliminates the need for making the width of the emission line equal to or smaller than a length corresponding to one pixel. The operation further enables high-resolution measurement compared to resolution defined by the pixel pitch on the light-receiving surface. In the case of performing the spatial center of gravity operation, received light data of plural pixels arranged in the width direction of the emission line within one frame constitute signals relating to signal processing.

The temporal center of gravity operation is an operation for determining, based on received light data of respective pixels at the same pixel position in plural frames, time when intensity of the received light at the pixel position is the maximum (time elapsed from start of projection). Unlike the spatial center of gravity operation, the temporal center of gravity operation makes it possible to correctly determine the center of gravity even if the reflectance of the object surface is uneven. In the case of performing the temporal center of gravity operation, received light data of plural pixels at the same pixel position extracted from the frames constitute signals relating to signal processing.

The following are descriptions of the characteristic operation in the three-dimensional position measurement apparatus 1.

In either case of the spatial center of gravity operation or the temporal center of gravity operation, it is necessary that a group of received light data (hereinafter referred to as a signal) used for the operation should have only one peak when data values (a signal level) are graphed with a pixel position or image capturing time being defined as the horizontal axis. If the signal has two peaks, the center of gravity cannot be determined correctly.

When primary reflected light and secondary reflected light are incident on the area sensor 22, a level of a signal obtained by the area sensor 22 is graphed in accordance with the manner described above, so that the signal has two peaks. Accordingly, in order to determine the center of gravity appropriately, prior to the center of gravity operation, it is necessary to correct the signal in a manner to have only one peak. In order to carry out the corrections properly, two kinds of signals are obtained in the manner described below.

Figure 2A:
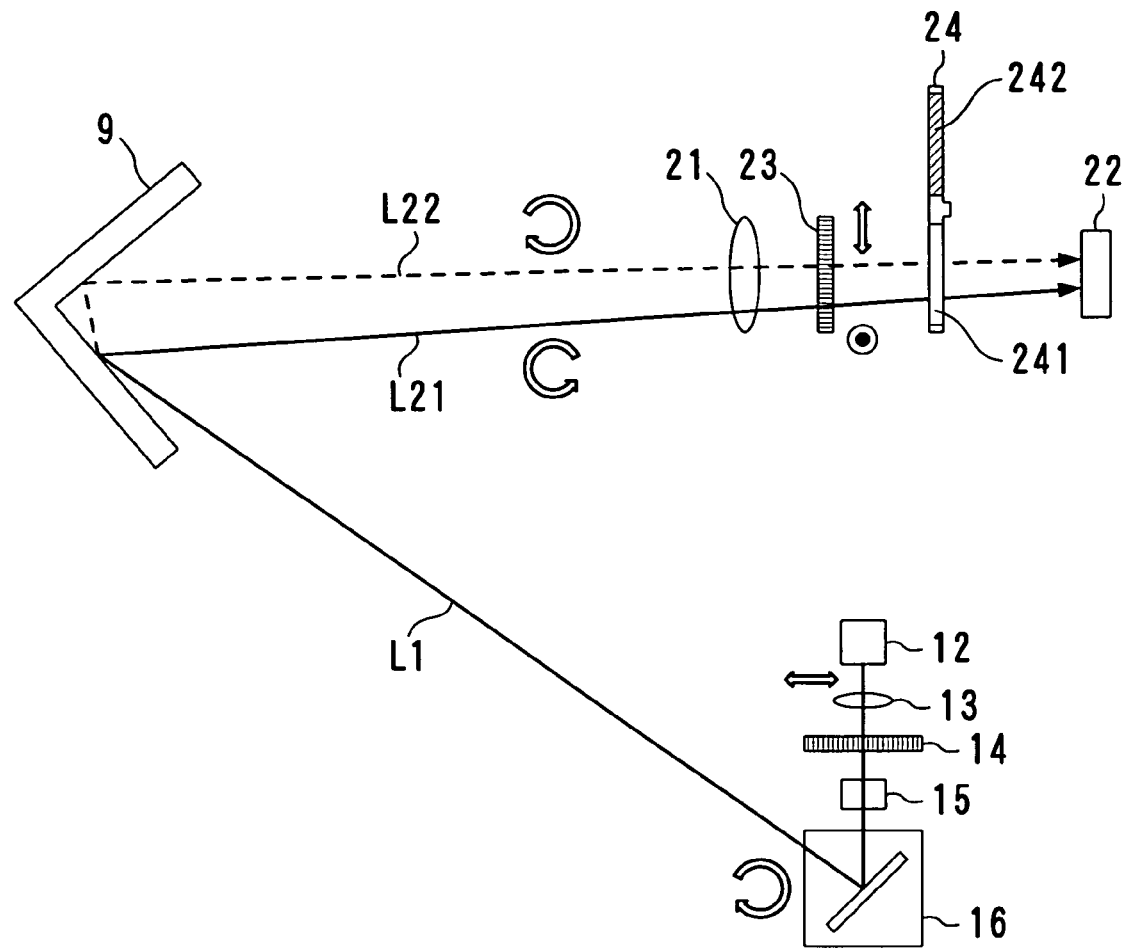
FIGS. 2A and 2B show configurations of an optical system according to the first embodiment.
Figure 2B:
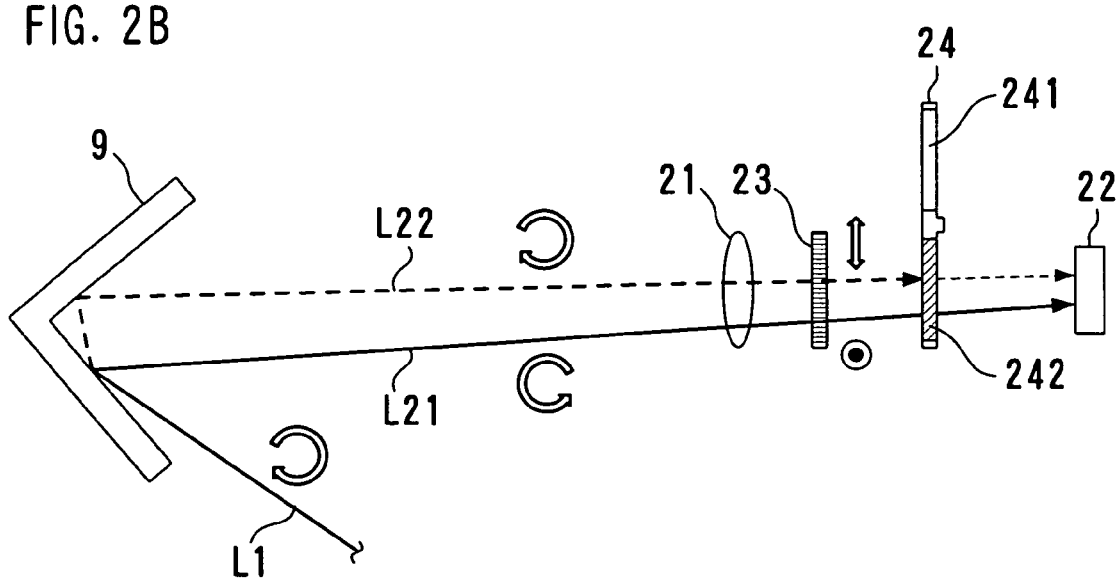

FIGS. 2A and 2B show configurations of an optical system according to the first embodiment.

Referring to FIGS. 2A and 2B, the measurement light L1 is reflected from an object to be measured 9 and primary reflected light L21 and secondary reflected light L22 are directed toward the area sensor 22. The primary reflected light L21 is circular polarized light that rotates in the direction opposite to the measurement light L1, while the secondary reflected light L22 is circular polarized light that rotates in the same direction as the measurement light L1. When passing through the quarter wavelength plate 23, the primary reflected light L21 becomes linear polarized light polarized in a first direction and the secondary reflected light L22 becomes linear polarized light polarized in a second direction orthogonal to the first direction.

The three-dimensional position measurement apparatus 1 optically scans the object 9 twice.

In either one of the two times, e.g., the first optical scan, the glass plate 241 is placed in the optical path between the quarter wavelength plate 23 and the area sensor 22 as shown in FIG. 2A. In this time optical scan, the primary reflected light L21 and the secondary reflected light L22 pass through the glass plate 241 in the substantially same manner and are incident on the area sensor 22. In this optical scan, a photoelectric conversion signal sensed by the area sensor 22 is obtained as a first signal. The first signal is received light information in the case where neither the primary reflected light L21 nor the secondary reflected light L22 is attenuated.

In the other optical scan, e.g., the second optical scan, the polarizing plate 242 is placed in the optical path between the quarter wavelength plate 23 and the area sensor 22 as shown in FIG. 2B. The rotating filter 24 is provided, in advance, with the polarizing plate 242 that selects the polarization direction so as to transmit the primary reflected light L21 and to block the secondary reflected light L22 when the polarizing plate 242 is placed in the optical path. However, the polarizing plate 242 cannot completely block the secondary reflected light L22. In this optical scan, the primary reflected light L21 that has passed through the polarizing plate 242 and the secondary reflected light L22 attenuated thereby are incident on the area sensor 22. In this optical scan, a photoelectric conversion signal sensed by the area sensor 22 is obtained as a second signal. The second signal is received light information in the case where the secondary reflected light L22 is selectively attenuated.

Figure 3A:
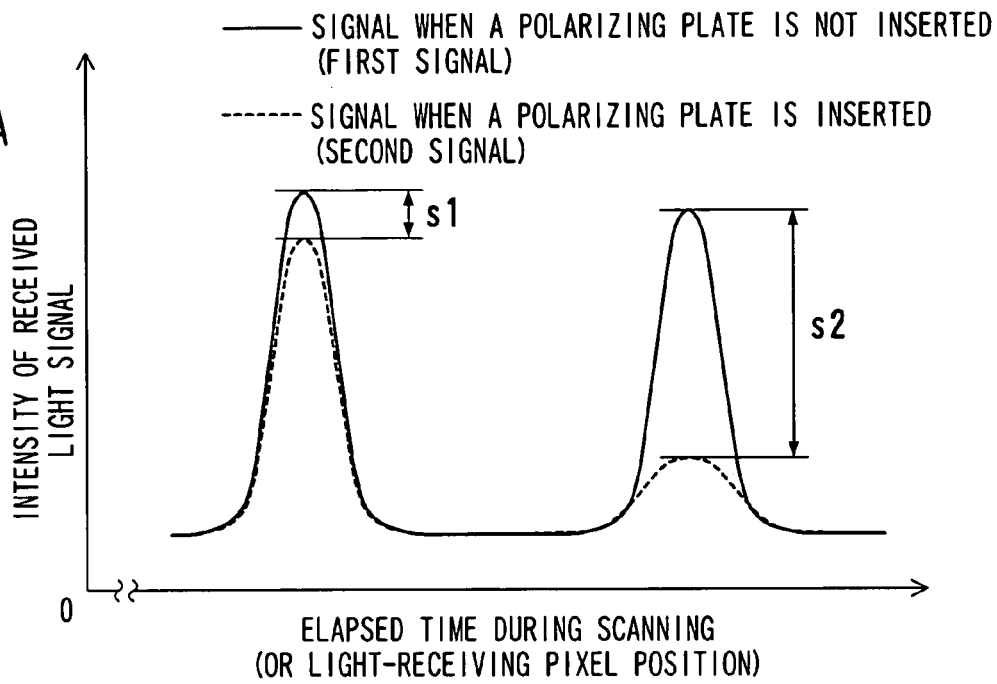
FIGS. 3A and 3B show the principles of signal processing according to the first embodiment.
Figure 3B:
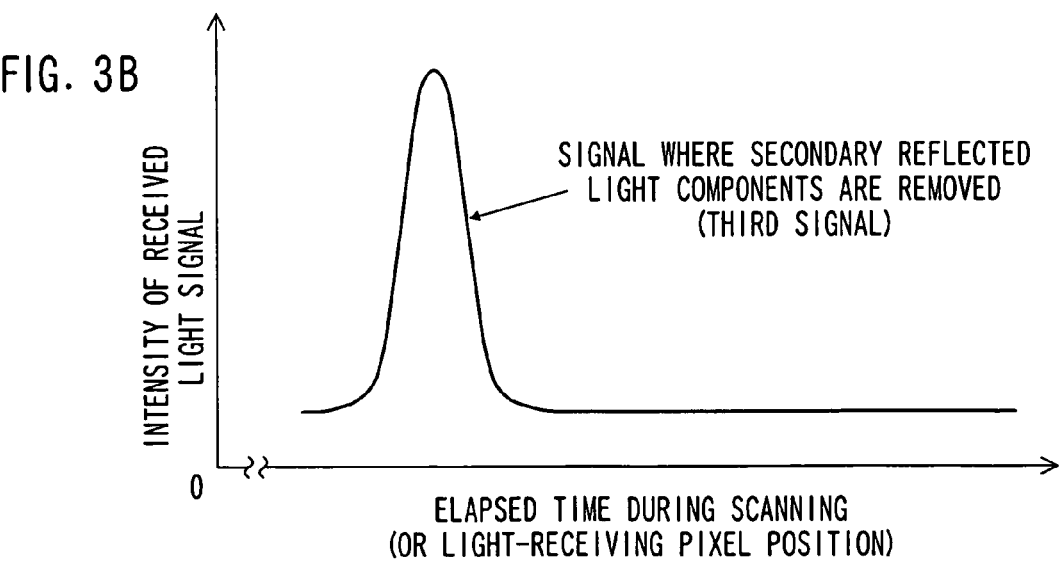

FIGS. 3A and 3B show the principles of signal processing according to the first embodiment.

Received light data are plotted with elapsed time during scanning (the case of temporal center of gravity operation) or light-receiving pixel position (the case of spatial center of gravity operation) being defined as the horizontal axis and intensity of received light signal being defined as the vertical axis, so that the graph shown in FIG. 3A is obtained. In FIG. 3A, a solid line curve shows a signal when the polarizing plate 242 is not placed in the optical path (the first signal described above), while a broken line curve shows a signal when the polarizing plate 242 is placed in the optical path (the second signal described above). Referring to FIGS. 3A and 3B, signals are shown by curves for the sake of convenience. Received light data practically obtained, however, are discrete data that are sampled for each frame period of image capturing with the area sensor 22 or for each pixel position on a light-receiving surface.

Referring to FIG. 3A, each of the first signal and the second signal has two peaks. When there are no differences in positional relationship with the object between the two times of scanning, peak positions in the horizontal axis are substantially the same between the two signals. In each of the signals, one of the two peaks corresponds to the primary reflected light L21 and the other corresponds to the secondary reflected light L22.

With the first signal (indicated by the solid line), there is not much difference between the peak level (signal value) shown on the left side of the drawing and the peak level shown on the right side thereof. In contrast, with the second signal (indicated by the broken line), the peak level shown on the right side is significantly lower than that shown on the left side. However, without mentioning only the first signal, as far as only the second signal is seen, it is not clear which of the two peaks corresponds to the primary reflected light L21. This is because the intensity of the secondary reflected light L22 may be higher than that of the primary reflected light L21 even if being attenuated by the polarizing plate 242 if the intensity of the secondary reflected light L22 (regularly reflected light) is much higher than that of the primary reflected light L21 when being incident on the polarizing plate 242.

When the first signal is compared with the second signal, in the illustrated example, a value of a level difference s2 between the peak of the first signal and the peak of the second signal shown on the right side is larger than a value of a level difference s1 therebetween shown on the left side. The larger value of the level difference means attenuation at the polarizing plate 242, which proves that the peak shown on the right side corresponds to the secondary reflected light L22.

In this way, a portion corresponding to the primary reflected light L21 (primary reflected light components) is distinguished from a portion corresponding to the secondary reflected light L22 (secondary reflected light components) in each of the signals. Then, the secondary reflected light components are removed from the first signal or the second signal, which enables generation of a third signal that is received light information only for the primary reflected light, as shown in FIG. 3B.

The signal processing for removing the secondary reflected light components includes processing of extracting from the first signal a signal value in which the absolute value of the difference from the second signal is smaller than a set threshold value, and processing of extracting from the second signal a signal value in which the absolute value of the difference from the first signal is smaller than a set threshold value. Note that, compared to the latter processing, the former processing makes it possible to obtain a signal having a wider dynamic range.

Figure 4:
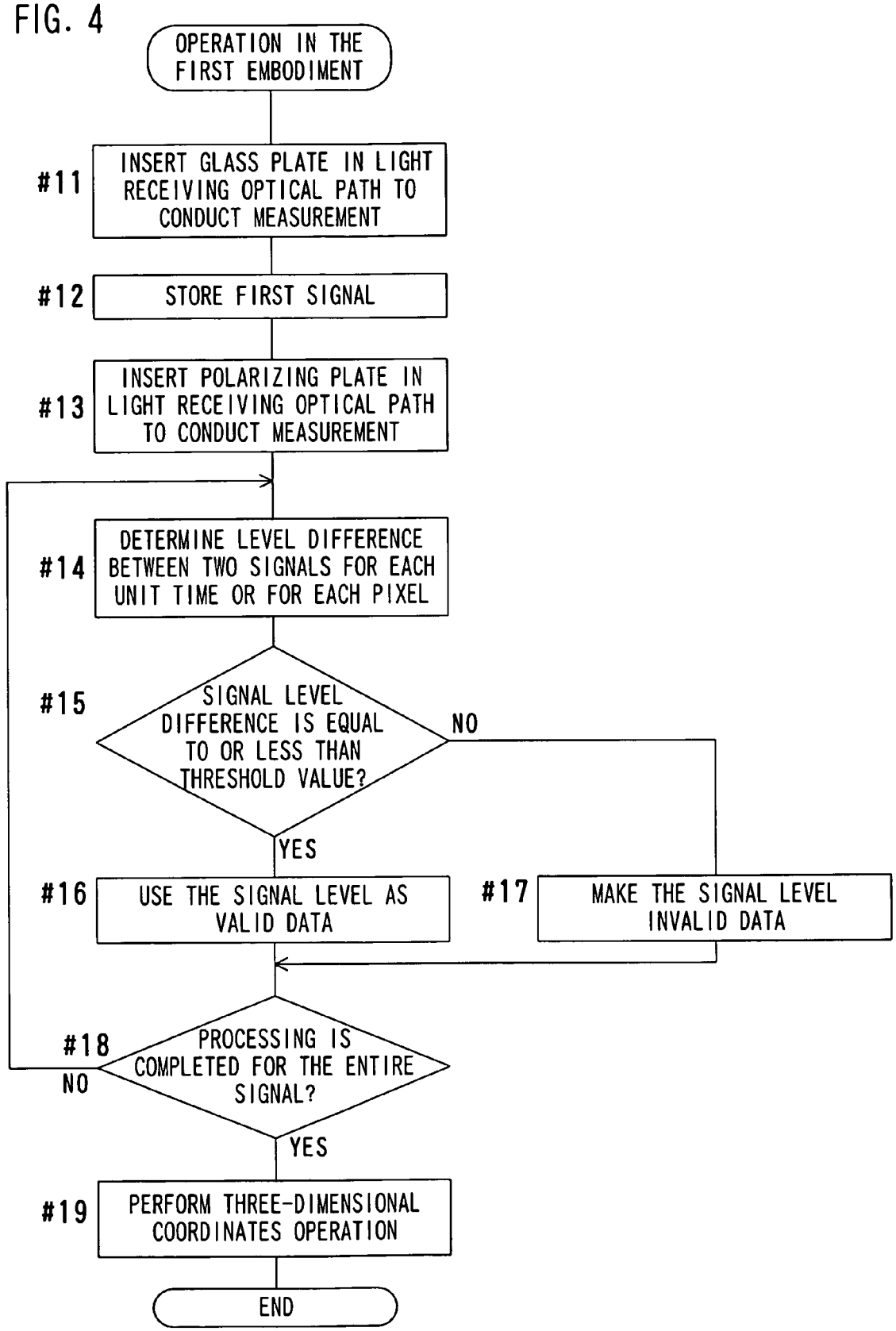
FIG. 4 is a flowchart showing the operation of the three-dimensional position measurement apparatus according to the first embodiment.

FIG. 4 is a flowchart showing the operation of the three-dimensional position measurement apparatus 1 according to the first embodiment.

In order to obtain the first signal, the glass plate 241 is interposed in a light receiving optical path to perform first scan (#11). On this occasion, the first signal thus obtained is stored in the memory 58 (#12). Subsequently, in order to obtain the second signal, the polarizing plate 242 is interposed in the light receiving optical path to perform second scan (#13).

The three-dimensional position measurement apparatus 1 incorporates the first signal and the second signal into the secondary reflected light removal processing portion 41 of the data processor 32 to perform signal processing for obtaining a third signal. More specifically, first, the fist signal is compared with the second signal for each unit time, e.g., each frame period, or for each pixel on a light-receiving surface to determine the level difference between the signals (#14). When the value of the level difference is equal to or less than the set threshold value, the compared level is determined to be valid (#15 and #16). When the value of the level difference is not equal to or less than the set threshold value, the compared level is determined to be invalid (#15 and #17). The calculation of the level difference and the comparison with the threshold value are performed for the entire first signal and second signal (#18). A group of the levels determined to be valid is the third signal.

Then, the third signal is introduced into the center of gravity operation portion 42 for calculating a temporal center of gravity or a spatial center of gravity. The calculation result is introduced into the three-dimensional shape operation portion 43 to perform a coordinates operation based on the principles of the triangulation method (#19).

In the first embodiment described above, when the first signal is obtained that attenuates neither the primary reflected light nor the secondary reflected light, it is unnecessary to interpose the quarter wavelength plate 23 in the optical path. In other words, it is preferable to interpose the quarter wavelength plate 23 in the optical path only when the second signal is obtained. Accordingly, it is possible to attach the quarter wavelength plate 23 to the rotating filter 24 so as to be placed on the front side of the polarizing plate 242, instead of fixedly placing the quarter wavelength plate 23 on the front side of the rotating filter 24. Alternatively, it is possible to attach the quarter wavelength plate 23 to a moving mechanism cooperating with the rotating filter 24 so that the polarizing plate 242 and the quarter wavelength plate 23 may be interposed in the optical path or may be displaced therefrom.

Second Embodiment

With the second embodiment also, operation is performed twice for optically scanning an object to be measured and thereby a first signal and a second signal to be compared with each other are obtained in order to generate a signal where secondary reflected light components are removed.

Figure 5:
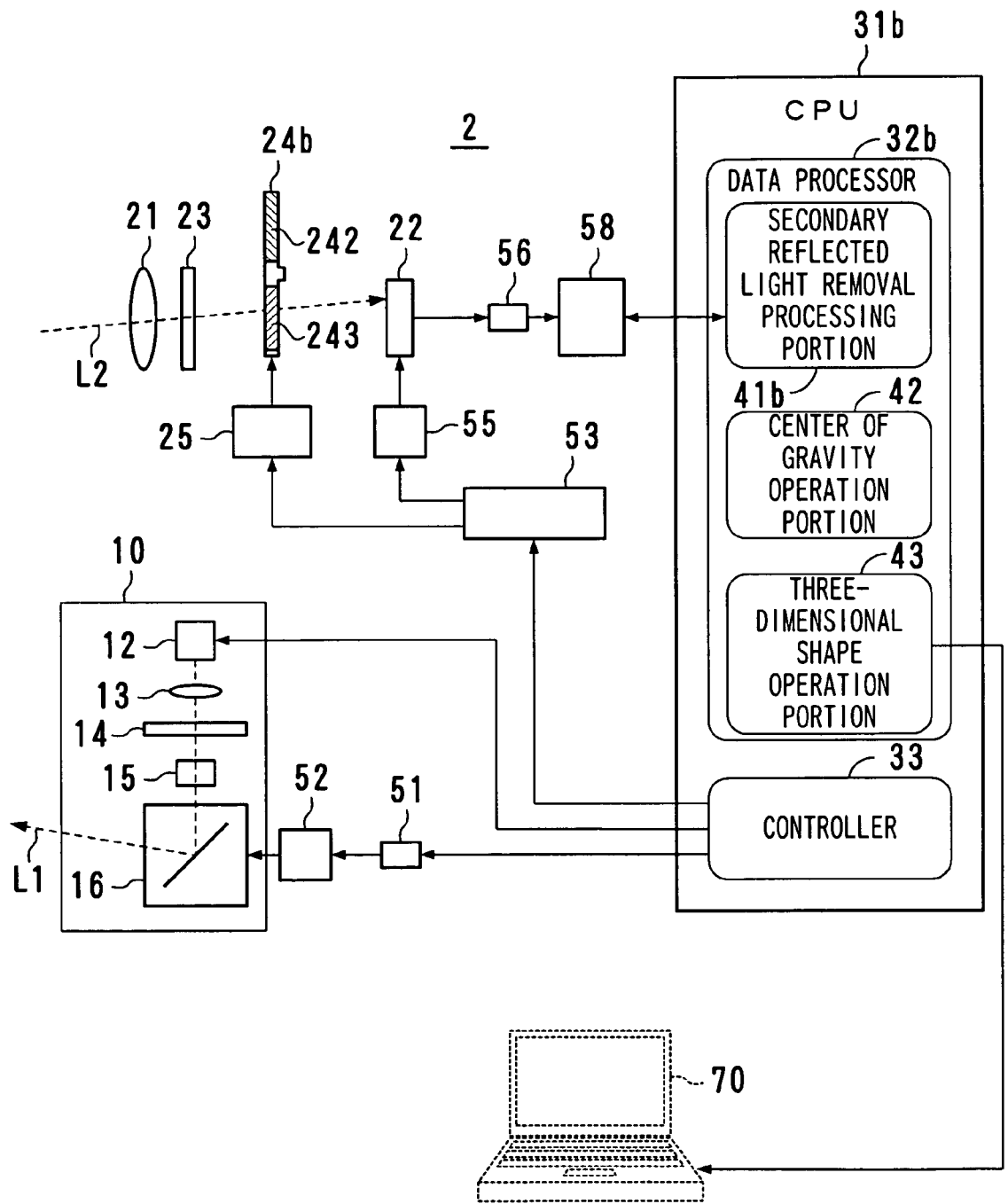
FIG. 5 is a diagram showing a configuration of a three-dimensional position measurement apparatus according to a second embodiment.

FIG. 5 is a diagram showing a configuration of a three-dimensional position measurement apparatus 2 according to the second embodiment. In FIG. 5, structural elements having the same functions as those in the example shown in FIG. 1 are given the same reference numerals/symbols as the structural elements in FIG. 1. Hereinafter, descriptions of the structural elements are omitted or simplified in order to avoid duplication of description.

The three-dimensional position measurement apparatus 2 includes a rotating filter 24b for obtaining two kinds of signals. The main difference between the second embodiment and the first embodiment is that the rotating filter 24b is included instead of the rotating filter 24.

The rotating filter 24b has a rotator for supporting the polarizing plate 242 and a polarizing plate 243 that differ from each other in polarization direction. The rotating filter 24b interposes the polarizing plate 242 or the polarizing plate 243 in the optical path between the quarter wavelength plate 23 and the area sensor 22.

The reflected light L2 passes through the light-receiving lens 21, the quarter wavelength plate 23 and the rotating filter 24b in this order and then to enter the area sensor 22. The A/D converter 56 converts the output from the area sensor 22 into digital received light data having a predetermined bit. The received light data are temporarily stored in the memory 58 and are loaded into a CPU 31b.

The CPU 31b includes a function of a data processor 32b. The data processor 32b includes a secondary reflected light removal processing portion 41b, the center of gravity operation portion 42 and the three-dimensional shape operation portion 43.

The three-dimensional position measurement apparatus 2 including the structural elements described above optically scans the object twice.

In either one of the two times, e.g., the first optical scan, the polarizing plate 243 is placed in the optical path between the quarter wavelength plate 23 and the area sensor 22. The rotating filter 24b is provided, in advance, with the polarizing plate 243 that selects the polarization direction so as to block the primary reflected light L21 and to transmit the secondary reflected light L22 when the polarizing plate 243 is placed in the optical path. In this time optical scan, the primary reflected light L21 attenuated by the polarizing plate 243 and the secondary reflected light L22 that has passed through the polarizing plate 243 are incident on the area sensor 22. In this optical scan, a photoelectric conversion signal sensed by the area sensor 22 is obtained as a first signal. The first signal according to the second embodiment is received light information in the case where the primary reflected light L21 is selectively attenuated.

In the other optical scan, e.g., the second optical scan, the polarizing plate 242 is placed in the optical path between the quarter wavelength plate 23 and the area sensor 22. The rotating filter 24b is provided, in advance, with the polarizing plate 242 that selects the polarization direction so as to block the secondary reflected light L22 and to transmit the primary reflected light L21 when the polarizing plate 242 is placed in the optical path. In this optical scan, the primary reflected light L21 that has passed through the polarizing plate 242 and the secondary reflected light L22 attenuated thereby are incident on the area sensor 22. In this optical scan, a photoelectric conversion signal sensed by the area sensor 22 is obtained as a second signal. The second signal is received light information in the case where the secondary reflected light L22 is selectively attenuated.

Figure 6A:
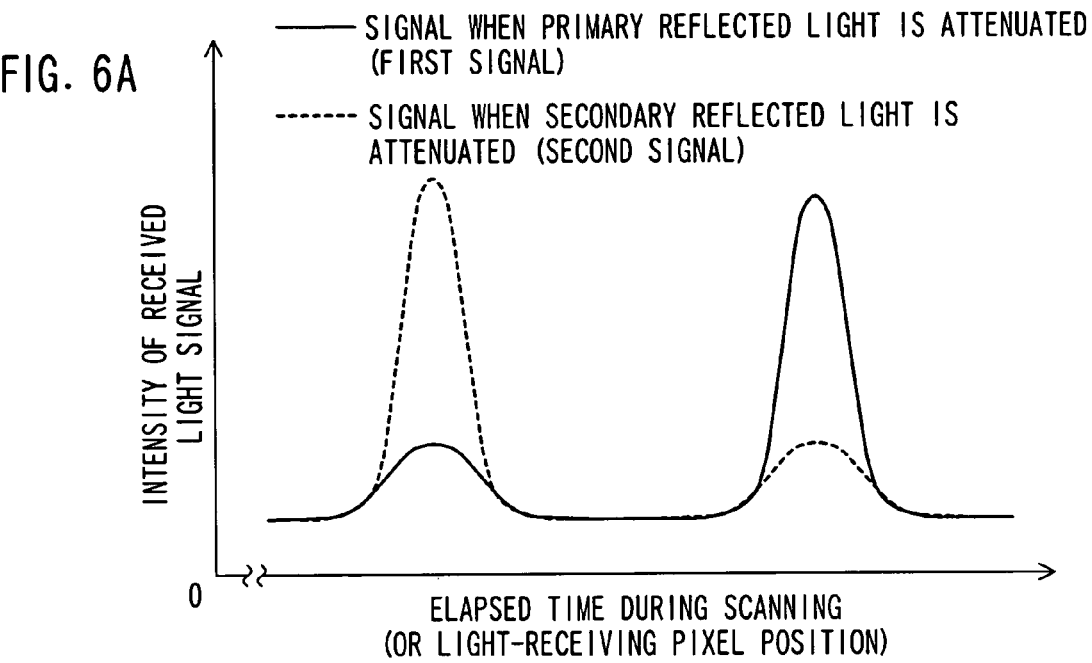
FIGS. 6A and 6B show the principles of signal processing according to the second embodiment.
Figure 6B:
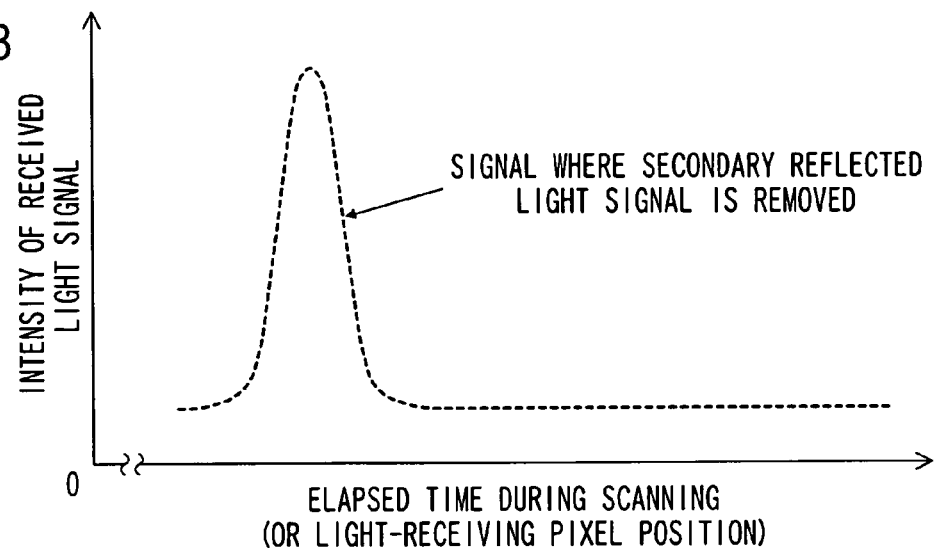

FIGS. 6A and 6B show the principles of signal processing according to the second embodiment.

Received light data are plotted with elapsed time during scanning (the case of temporal center of gravity operation) or light-receiving pixel position (the case of spatial center of gravity operation) being defined as the horizontal axis and intensity of received light signal being defined as the vertical axis, so that the graph shown in FIG. 6A is obtained. In FIG. 6A, a solid line curve shows a signal when the polarizing plate 243 is placed in the optical path to attenuate the primary reflected light L21 (the first signal described above), while a broken line curve shows a signal when the polarizing plate 242 is placed in the optical path to attenuate the secondary reflected light L22 (the second signal described above). Referring to FIGS. 6A and 6B, signals are shown by curves for the sake of convenience. Received light data practically obtained, however, are discrete data that are sampled for each frame period of image capturing with the area sensor 22 or for each pixel position on a light-receiving surface.

Referring to FIG. 6A, each of the first signal and the second signal has two peaks. When there are no differences in positional relationship with the object between the two times of scanning, peak positions in the horizontal axis are substantially the same between the two signals. In each of the signals, one of the two peaks corresponds to the primary reflected light L21 and the other corresponds to the secondary reflected light L22.

With the first signal (indicated by the solid line), the peak level shown on the left side of the drawing is significantly lower than that shown on the right side thereof. In contrast, with the second signal (indicated by the broken line), the peak level shown on the right side is significantly lower than that shown on the left side. In the first signal and the second signal, as far as only one of them is seen, it is not clear which of the two peaks corresponds to the primary reflected light L21. The reason is the same as in the case of the first embodiment.

When the first signal is compared with the second signal, in the illustrated example, a level of the second signal is higher than that of the first signal in the peaks shown on the left side of the drawing, and a level of the first signal is higher than that of the second signal in the peaks shown on the right side thereof. This proves that the peak level shown on the right side is lowered by the polarizing plate 242, i.e., the peaks on the right side correspond to the secondary reflected light L22.

In this way, a portion corresponding to the primary reflected light L21 (primary reflected light components) is distinguished from a portion corresponding to the secondary reflected light L22 (secondary reflected light components) in each of the signals. Then, the secondary reflected light components are removed from the first signal or the second signal, which enables generation of a third signal that is received light information only for the primary reflected light, as shown in FIG. 6B.

The signal processing for removing the secondary reflected light components includes processing of extracting from the second signal a signal value larger than the first signal. This processing has the advantage that a signal to be obtained has a wider dynamic range compared to processing of extracting from the first signal a signal value smaller than the second signal.

Figure 7:
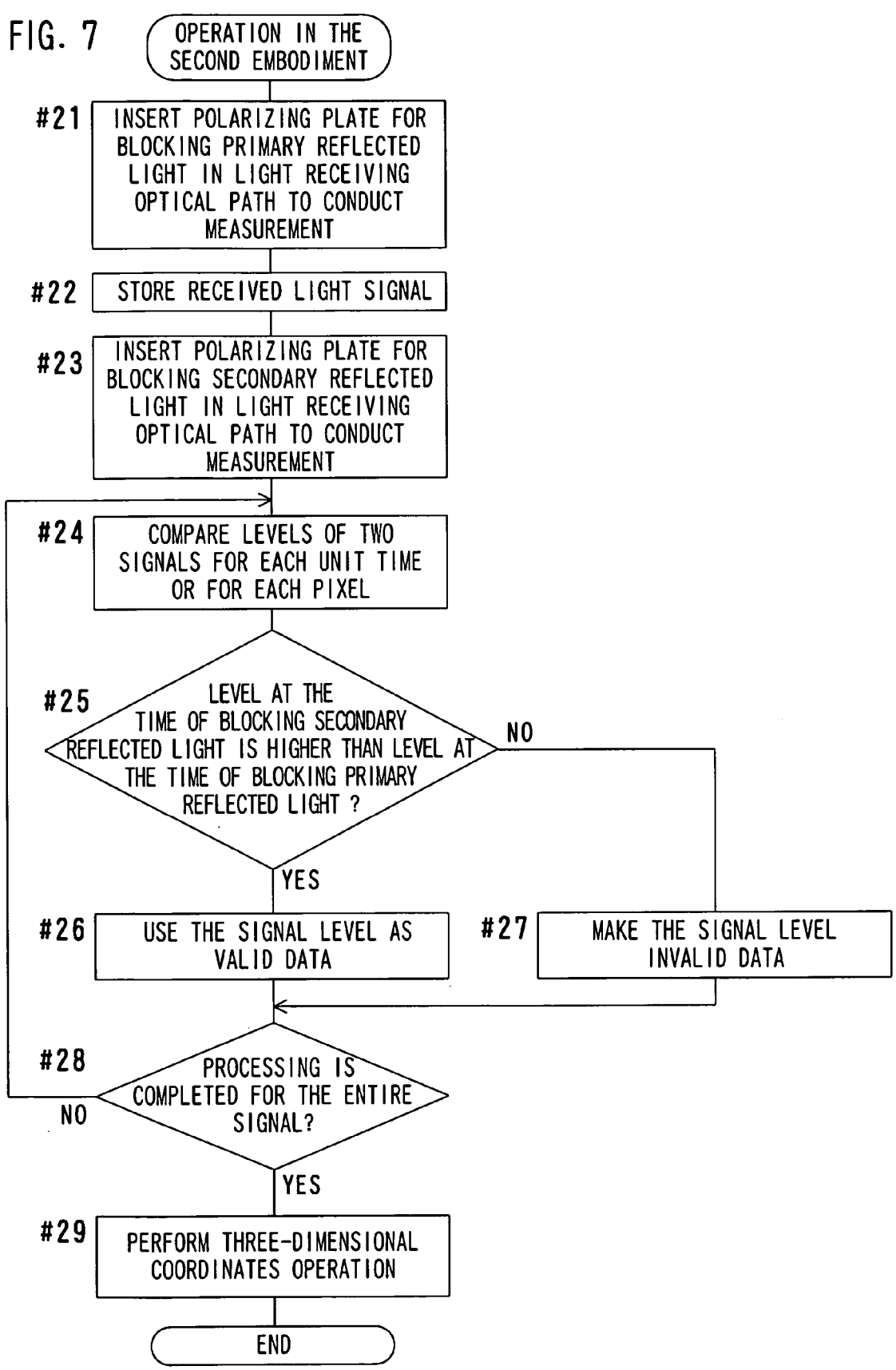
FIG. 7 is a flowchart showing the operation of the three-dimensional position measurement apparatus according to the second embodiment.

FIG. 7 is a flowchart showing the operation of the three-dimensional position measurement apparatus 2 according to the second embodiment.

In order to obtain the first signal, the polarizing plate 243 is interposed in a light receiving optical path to perform first scan (#21). On this occasion, the first signal thus obtained is stored in the memory 58 (#22). Subsequently, in order to obtain the second signal, the polarizing plate 242 is interposed in the light receiving optical path to perform second scan (#23).

The three-dimensional position measurement apparatus 2 incorporates the first signal and the second signal into the secondary reflected light removal processing portion 41b of the data processor 32b to perform signal processing for obtaining a third signal. More specifically, first, levels of the two signals are compared with each other for each unit time, e.g., each frame period, or for each pixel on a light-receiving surface (#24). When the level at the time of blocking the secondary reflected light (a second signal level) is higher than the level at the time of blocking the primary reflected light (a first signal level), the second signal level is determined to be valid (#25 and #26). Otherwise, the second signal level is determined to be invalid (#25 and #27). The comparison of levels is performed for the entire first signal and second signal (#28). A group of the levels determined to be valid in the second signal is the third signal.

Then, the third signal is introduced into the center of gravity operation portion 42 for calculating a temporal center of gravity or a spatial center of gravity. The calculation result is introduced into the three-dimensional shape operation portion 43 to perform a coordinates operation based on the principles of the triangulation method (#29).

Third Embodiment

With the third embodiment, an optical device for splitting reflected light and two photoelectric detectors are used and thereby a first signal and a second signal to be compared with each other are obtained by a single scan at the same time in order to generate a signal where secondary reflected light components are removed.

Figure 8:
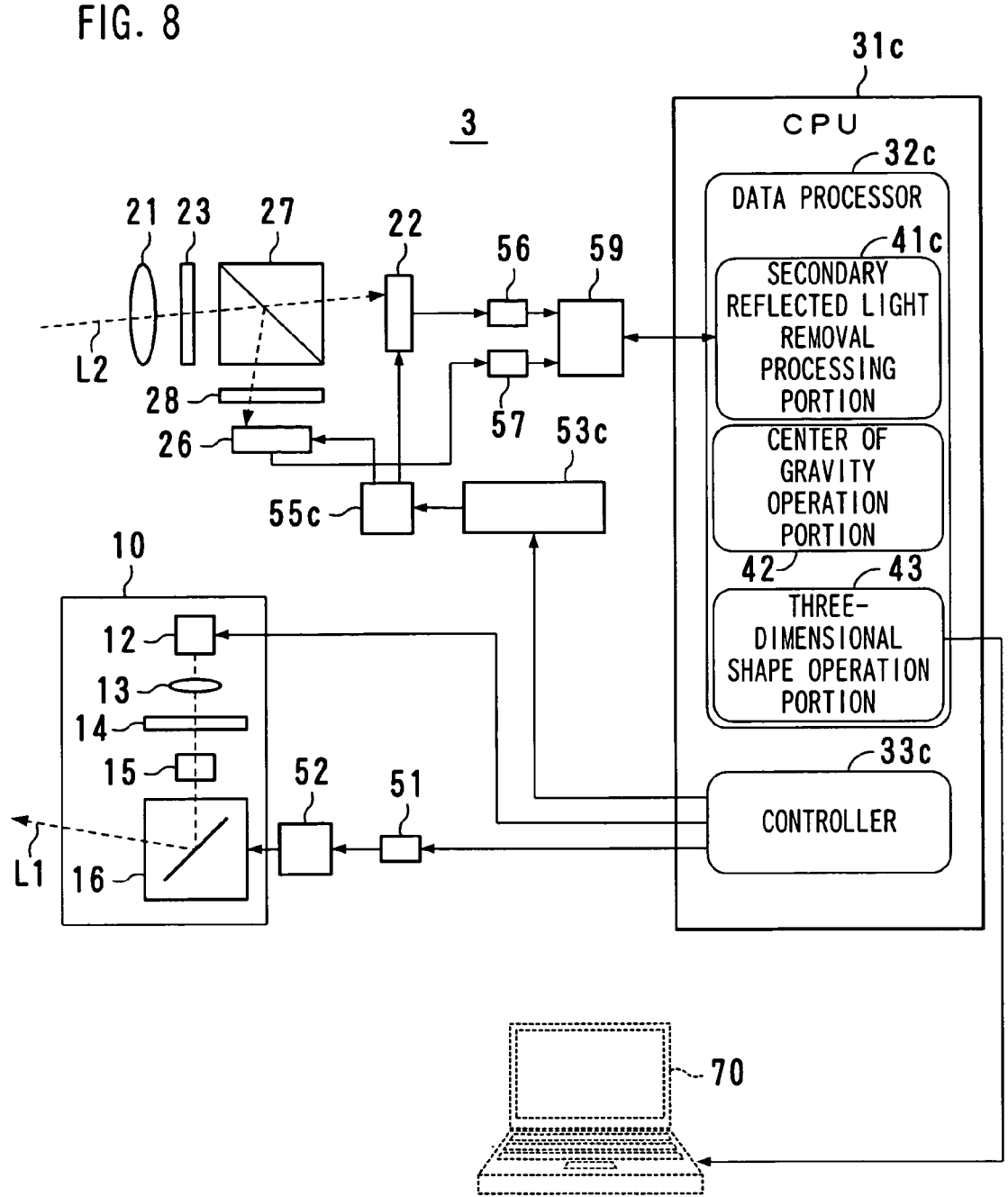
FIG. 8 is a diagram showing a configuration of a three-dimensional position measurement apparatus according to a third embodiment.

FIG. 8 is a diagram showing a configuration of a three-dimensional position measurement apparatus 3 according to the third embodiment. In FIG. 8, structural elements having the same functions as those in the example shown in FIG. 1 are given the same reference numerals/symbols as the structural elements in FIG. 1. Hereinafter, descriptions of the structural elements are omitted or simplified in order to avoid duplication of description.

The three-dimensional position measurement apparatus 3 includes, as elements for obtaining two kinds of signals, a beam splitting prism 27 having a semitransparent reflecting plane, an area sensor 26 functioning as a second light detector and a polarizing plate 28. The main difference between the third embodiment and the first embodiment is that these elements are included instead of the rotating filter 24.

The beam splitting prism 27 is placed between the quarter wavelength plate 23 and the area sensor 22 functioning as a first light detector. The beam splitting prism 27 splits the reflected light L2 that has passed through the quarter wavelength plate 23 into first split reflected light and second split reflected light, both of which have substantially the same amount of light. The beam splitting prism 27 is so positioned that the first split reflected light is incident on the area sensor 22. Note that the first split reflected light may be light to be passed through the beam splitting prism 27 or light to be reflected inside the beam splitting prism 27.

The area sensor 26 is a two-dimensional imaging device having the same structure as the area sensor 22. The area sensor 26 is placed at a position on which the second split reflected light emitted from the beam splitting prism 27 is incident.

The polarizing plate 28 is placed between the beam splitting prism 27 and the area sensor 26 so that the polarization direction is selected so as to transmit primary reflected light included in the second split reflected light and to block secondary reflected light included therein.

In the three-dimensional position measurement apparatus 3, the area sensor 22 and the area sensor 26 operate in accordance with clocks supplied from a drive circuit 55c. The A/D converter 56 converts the output from the area sensor 22 into received light data, which are then to be temporarily stored in a memory 59 as a first signal. An A/D converter 57 converts the output from the area sensor 26 into received light data, which are then to be temporarily stored in the memory 59 as a second signal. Then, the first signal and the second signal are loaded into a CPU 31c.

The CPU 31c functions as a data processor 32c and a controller 33c. The data processor 32c includes a secondary reflected light removal processing portion 41c, the center of gravity operation portion 42 and the three-dimensional shape operation portion 43. The controller 33c controls the laser-generating portion 12, the scanner driver 52 and an imaging controller 53c. The imaging controller 53c controls the drive circuit 55c.

Figure 9:
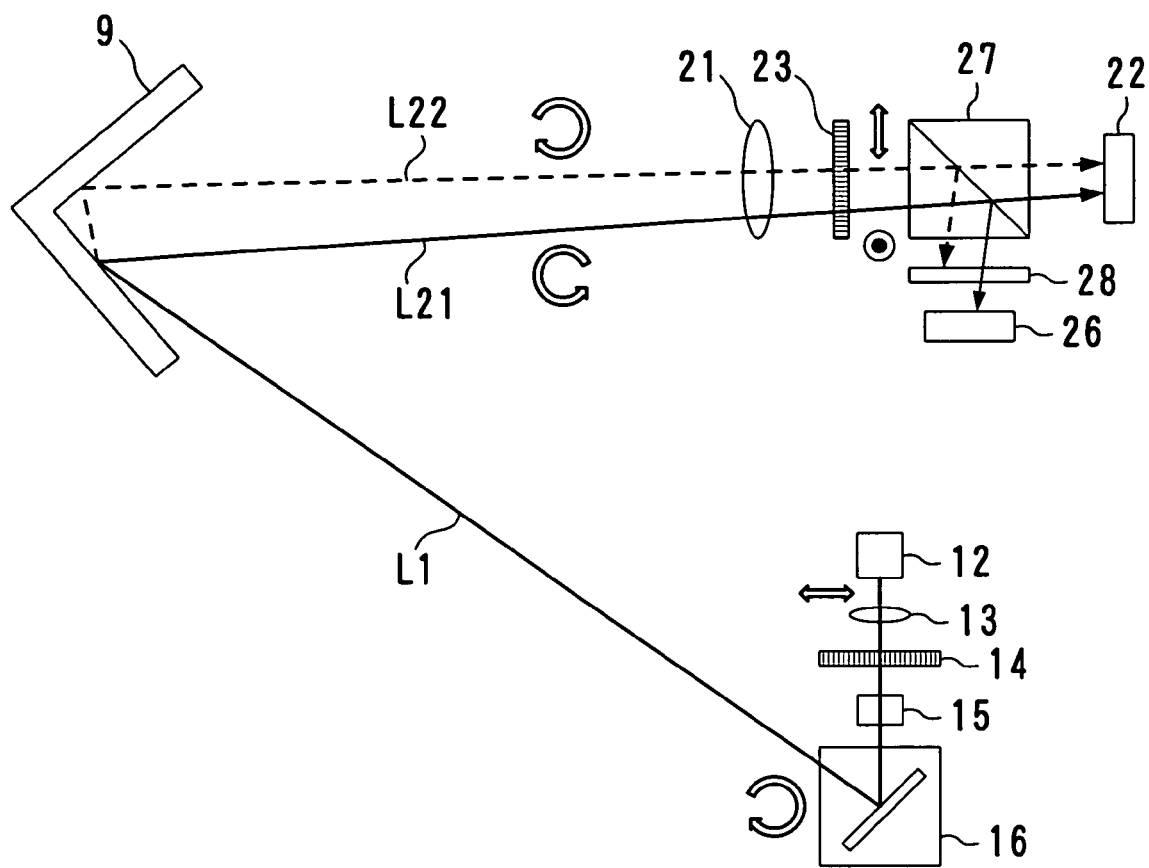
FIG. 9 shows a configuration of an optical system according to the third embodiment.

FIG. 9 shows a configuration of an optical system according to the third embodiment.

Referring to FIG. 9, the measurement light L1 is reflected from the object to be measured 9 and the primary reflected light L21 and the secondary reflected light L22 are directed toward the beam splitting prism 27. The primary reflected light L21 is circular polarized light that rotates in the direction opposite to the measurement light L1, while the secondary reflected light L22 is circular polarized light that rotates in the same direction as the measurement light L1. When passing through the quarter wavelength plate 23, the primary reflected light L21 becomes linear polarized light polarized in a first direction and the secondary reflected light L22 becomes linear polarized light polarized in a second direction orthogonal to the first direction.

The primary reflected light L21 is split by the beam splitting prism 27 and is directed toward the area sensor 22 and the area sensor 26. Likewise, the secondary reflected light L22 is split by the beam splitting prism 27 and is directed toward the area sensor 22 and the area sensor 26.

The primary reflected light L21 and the secondary reflected light L22 that are directed toward the area sensor 22 are incident on the area sensor 22 without any change. A photoelectric conversion signal sensed by the area sensor 22 is obtained as a first signal. The first signal is received light information in the case where neither the primary reflected light L21 nor the secondary reflected light L22 is attenuated.

In contrast, among the primary reflected light L21 and the secondary reflected light L22 that are directed toward the area sensor 26, the secondary reflected light L22 is blocked by the polarizing plate 28. However, the polarizing plate 28 cannot completely block the secondary reflected light L22. The primary reflected light L21 that has passed through the polarizing plate 28 and the secondary reflected light L22 attenuated thereby are incident on the area sensor 26. A photoelectric conversion signal sensed by the area sensor 26 is obtained as a second signal. The second signal is received light information in the case where the secondary reflected light L22 is selectively attenuated.

In the third embodiment, signal processing is performed that is the same as in the case of the first embodiment based on the principles shown in FIG. 3. Thereby, it is possible to generate a third signal that is obtained by removing the secondary reflected light components from the first signal and the second signal.

Figure 10:
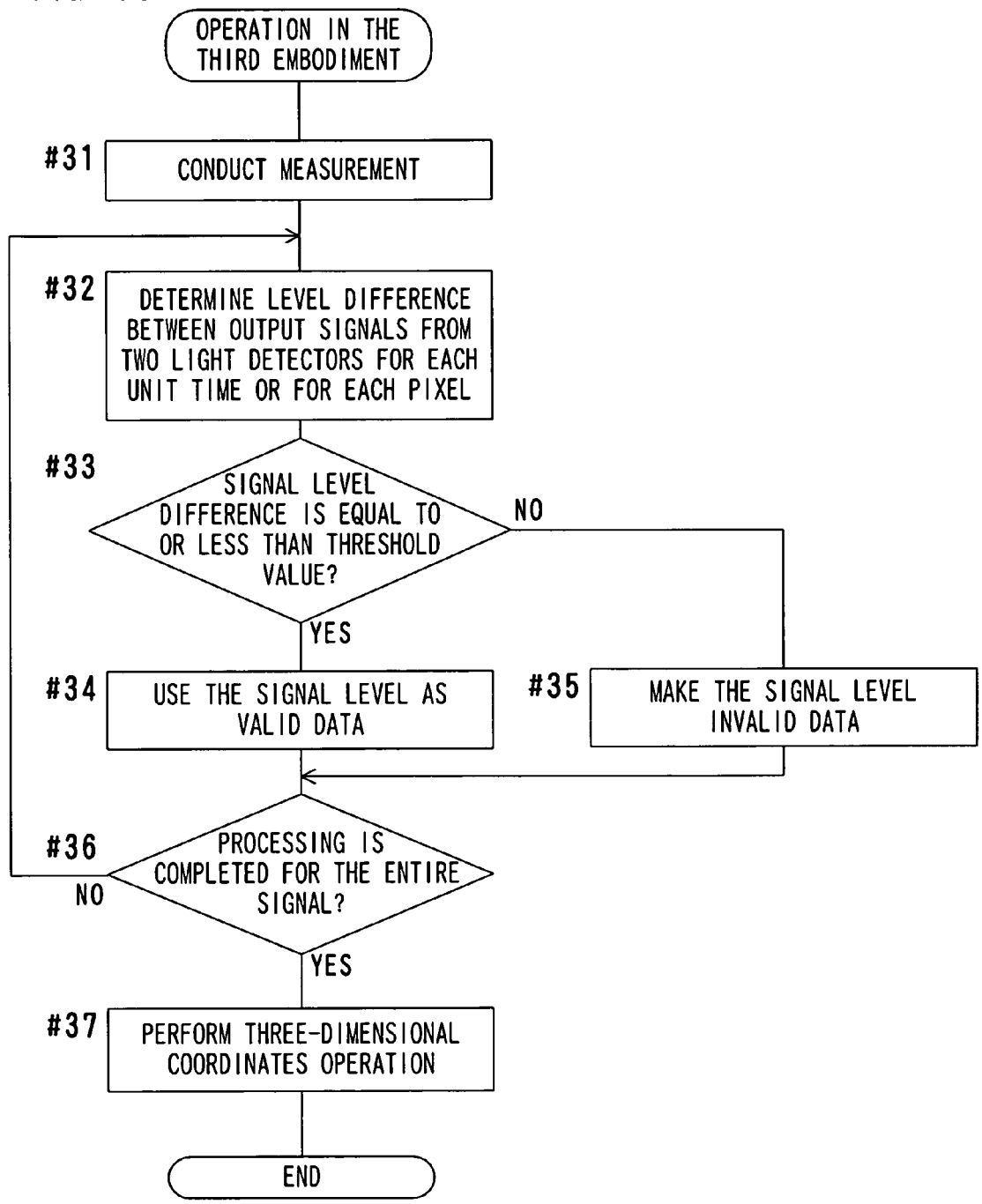
FIG. 10 is a flowchart showing the operation of the three-dimensional position measurement apparatus according to the third embodiment.

FIG. 10 is a flowchart showing the operation of the three-dimensional position measurement apparatus 3 according to the third embodiment.

In order to obtain the first signal and the second signal, an object to be measured is scanned (#31).

The three-dimensional position measurement apparatus 3 incorporates the first signal and the second signal into the secondary reflected light removal processing portion 41c of the data processor 32c to perform signal processing for obtaining a third signal. More specifically, first, the first signal is compared with the second signal for each unit time, e.g., each frame period, or for each pixel on a light-receiving surface to determine the level difference between the signals (#32). When the value of the level difference is equal to or less than the set threshold value, the compared level is determined to be valid (#33 and #34). When the value of the level difference is not equal to or less than the set threshold value, the compared level is determined to be invalid (#33 and #35). The calculation of the level difference and the comparison with the threshold value are performed for the entire first signal and second signal (#36). A group of the levels determined to be valid is the third signal.

Then, the third signal is introduced into the center of gravity operation portion 42 for calculating a temporal center of gravity or a spatial center of gravity. The calculation result is introduced into the three-dimensional shape operation portion 43 to perform a coordinates operation based on the principles of the triangulation method (#37).

In the third embodiment, when the first signal is obtained that attenuates neither the primary reflected light nor the secondary reflected light, it is unnecessary to interpose the quarter wavelength plate 23 in an optical path. In other words, only when the second signal is obtained, it is preferable to interpose the quarter wavelength plate 23 in the optical path. Accordingly, it is possible to place the quarter wavelength plate 23 between the beam splitting prism 27 and the polarizing plate 28, instead of placing the quarter wavelength plate 23 on the front side of the beam splitting prism 27.

Fourth Embodiment

With the fourth embodiment also, an optical device for splitting reflected light and two photoelectric detectors are used and thereby a first signal and a second signal to be compared with each other are obtained by a single scan at the same time in order to generate a signal where secondary reflected light components are removed.

Figure 11:
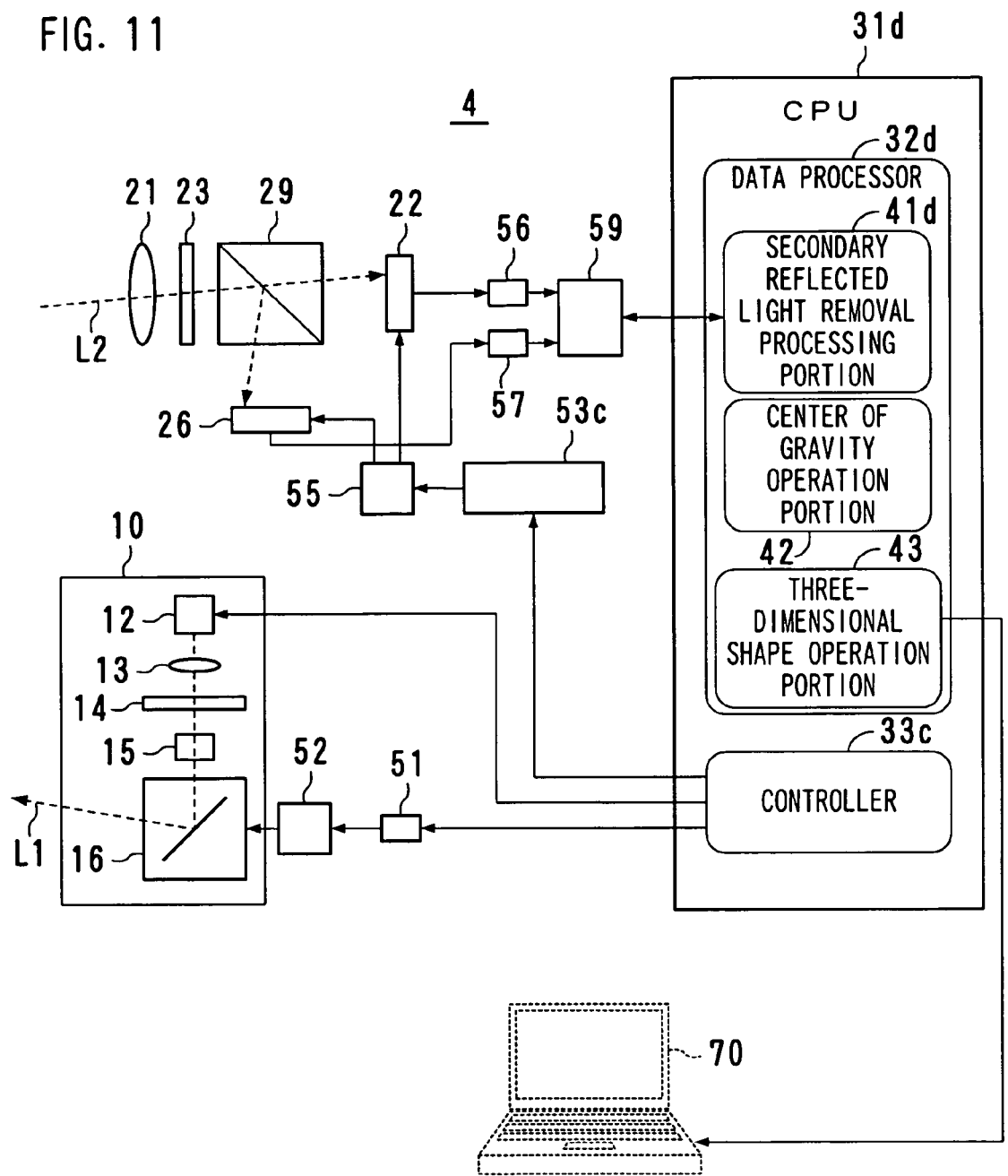
FIG. 11 is a diagram showing a configuration of a three-dimensional position measurement apparatus according to a fourth embodiment.

FIG. 11 is a diagram showing a configuration of a three-dimensional position measurement apparatus 4 according to the fourth embodiment. In FIG. 11, structural elements having the same functions as those in the example shown in FIG. 1 or FIG. 8 are given the same reference numerals/symbols as the structural elements in FIG. 1 or FIG. 8. Hereinafter, descriptions of the structural elements are omitted or simplified in order to avoid duplication of description.

The three-dimensional position measurement apparatus 4 includes, as elements for obtaining two kinds of signals, a polarizing beam splitter 29 and the area sensor 26 functioning as a second light detector. The main difference between the fourth embodiment and the first embodiment is that these elements are included instead of the rotating filter 24.

The polarizing beam splitter 29 is placed between the quarter wavelength plate 23 and the area sensor 22 functioning as a first light detector. In the polarizing beam splitter 29, reflected light that has passed through the quarter wavelength plate 23 is split into first split reflected light where primary reflected light is attenuated and second split reflected light where secondary reflected light is attenuated. The first split reflected light is incident on the area sensor 22, while the second split reflected light is incident on the area sensor 26.

In the three-dimensional position measurement apparatus 4, the A/D converter 56 converts the output from the area sensor 22 into received light data, which are then to be temporarily stored in the memory 59 as a first signal. The A/D converter 57 converts the output from the area sensor 26 into received light data, which are then to be temporarily stored in the memory 59 as a second signal. Then, the first signal and the second signal are loaded into a CPU 31d.

The CPU 31d functions as a data processor 32d and the controller 33c. The data processor 32d includes a secondary reflected light removal processing portion 41d, the center of gravity operation portion 42 and the three-dimensional shape operation portion 43.

Figure 12:
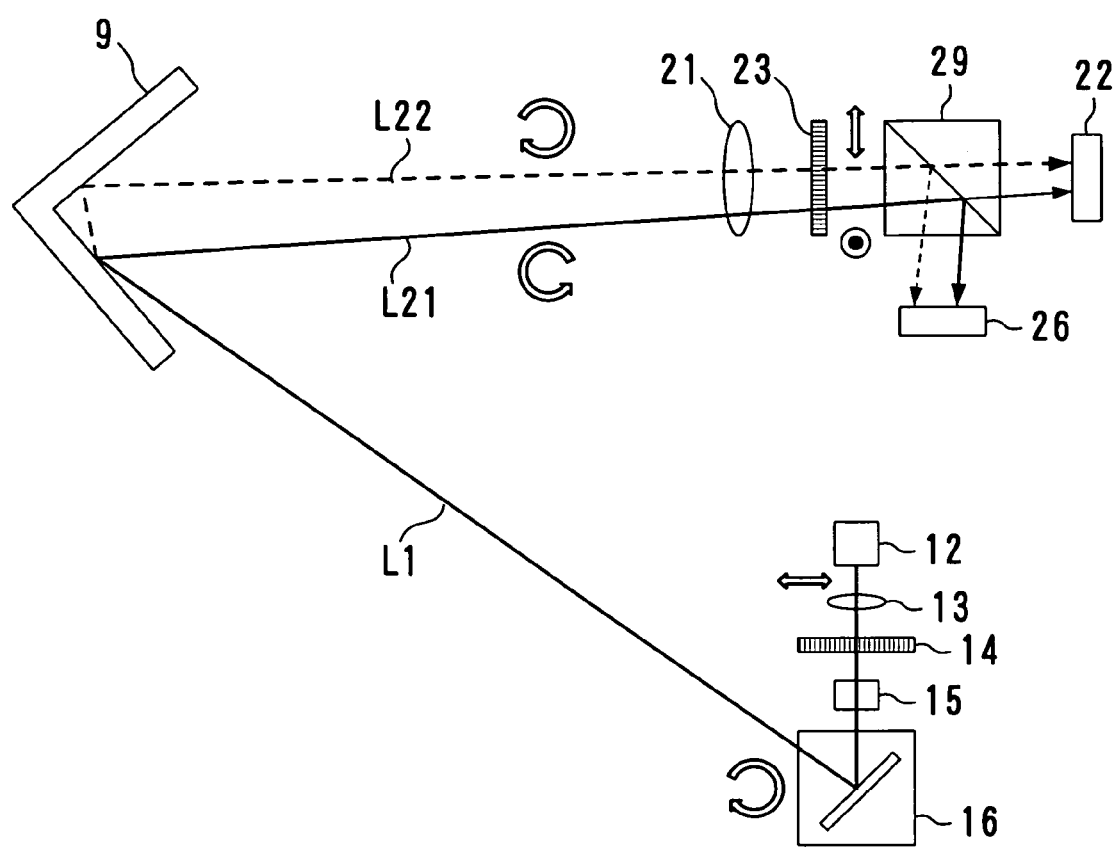
FIG. 12 shows a configuration of an optical system according to the fourth embodiment.

FIG. 12 shows a configuration of an optical system according to the fourth embodiment.

Referring to FIG. 12, the measurement light L1 is reflected from the object to be measured 9 and the primary reflected light L21 and the secondary reflected light L22 are directed toward the polarizing beam splitter 29. The primary reflected light L21 is circular polarized light that rotates in the direction opposite to the measurement light L1, while the secondary reflected light L22 is circular polarized light that rotates in the same direction as the measurement light L1. When passing through the quarter wavelength plate 23, the primary reflected light L21 becomes linear polarized light polarized in a first direction and the secondary reflected light L22 becomes linear polarized light polarized in a second direction orthogonal to the first direction.

The polarizing beam splitter 29 splits incident light into light to be directed toward the area sensor 22 and light to be directed toward the area sensor 26. Further, the polarizing beam splitter 29 blocks the primary reflected light L21 among the light to be directed toward the area sensor 22 and blocks the secondary reflected light L22 among the light to be directed toward the area sensor 26. However, the blocking is incomplete. The primary reflected light L21 attenuated by the polarizing beam splitter 29 and the secondary reflected light L22 that has passed therethrough are incident on the area sensor 22. The primary reflected light L21 that has passed through the polarizing beam splitter 29 and the secondary reflected light L22 attenuated thereby are incident on the area sensor 26.

A photoelectric conversion signal sensed by the area sensor 22 is obtained as a first signal. A photoelectric conversion signal sensed by the area sensor 26 is obtained as a second signal. The first signal is received light information in the case where the primary reflected light L21 is selectively attenuated. The second signal is received light information in the case where the secondary reflected light L22 is selectively attenuated.

In the fourth embodiment, signal processing is performed that is the same as in the case of the second embodiment based on the principles shown in FIG. 6. Thereby, it is possible to generate a third signal that is obtained by removing the secondary reflected light components from the first signal and the second signal.

Figure 13:
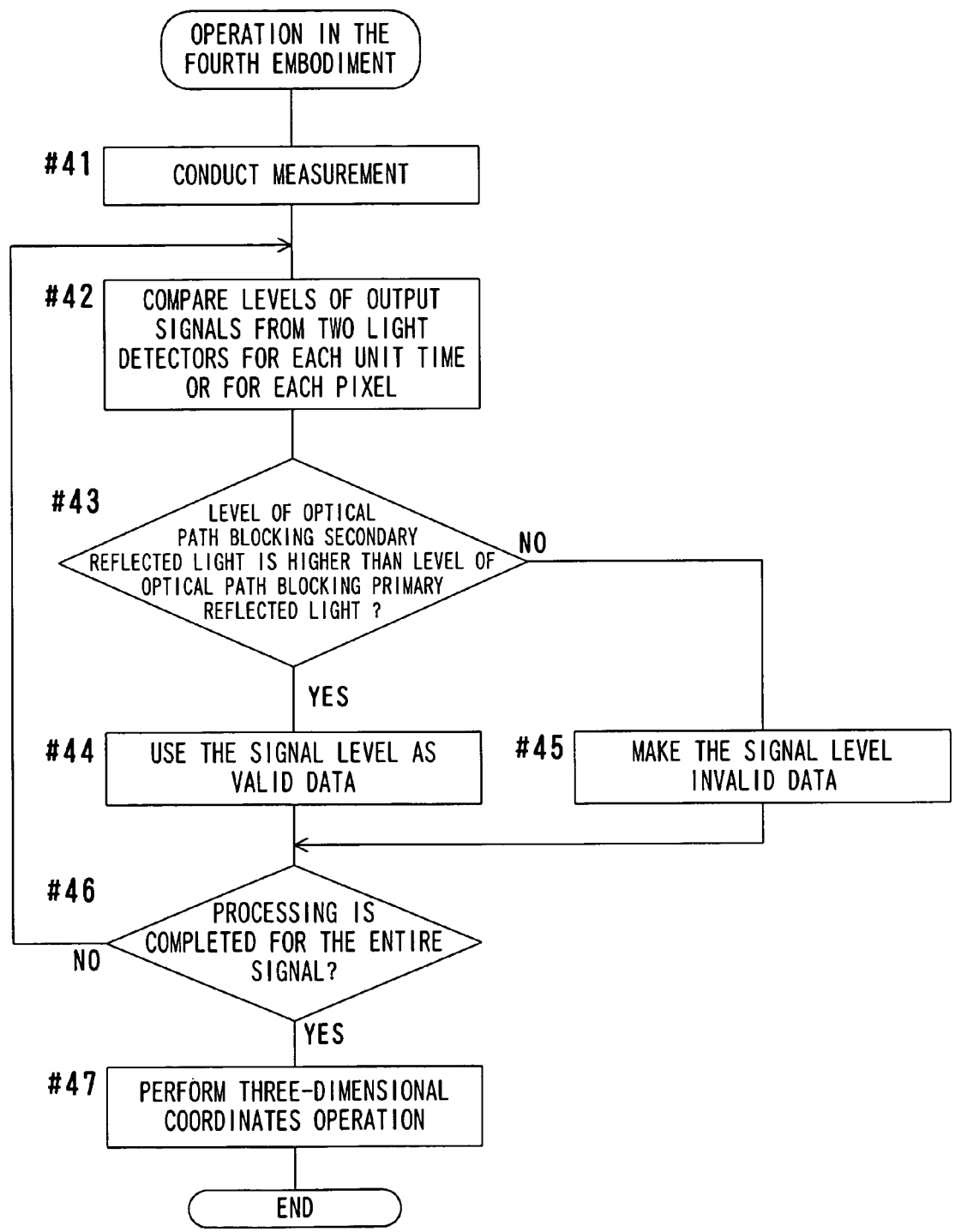
FIG. 13 is a flowchart showing the operation of the three-dimensional position measurement apparatus according to the fourth embodiment.

FIG. 13 is a flowchart showing the operation of the three-dimensional position measurement apparatus 4 according to the fourth embodiment.

In order to obtain the first signal and the second signal, an object to be measured is scanned (#41).

The three-dimensional position measurement apparatus 4 incorporates the first signal and the second signal into the secondary reflected light removal processing portion 41d of the data processor 32d to perform signal processing for obtaining a third signal. More specifically, first, levels of the two signals are compared with each other for each unit time, e.g., each frame period, or for each pixel on a light-receiving surface (#42). When the level at the time of blocking the secondary reflected light (a second signal level) is higher than the level at the time of blocking the primary reflected light (a first signal level), the second signal level is determined to be valid (#43 and #44). Otherwise, the second signal level is determined to be invalid (#43 and #45). The comparison of levels is performed for the entire first signal and second signal (#46). A group of the levels determined to be valid in the second signal is the third signal.

Fifth Embodiment

With the fifth embodiment, operation is performed twice for optically scanning an object to be measured and thereby a first signal and a second signal to be compared with each other are obtained in order to generate a signal where secondary reflected light components are removed.

Figure 14:
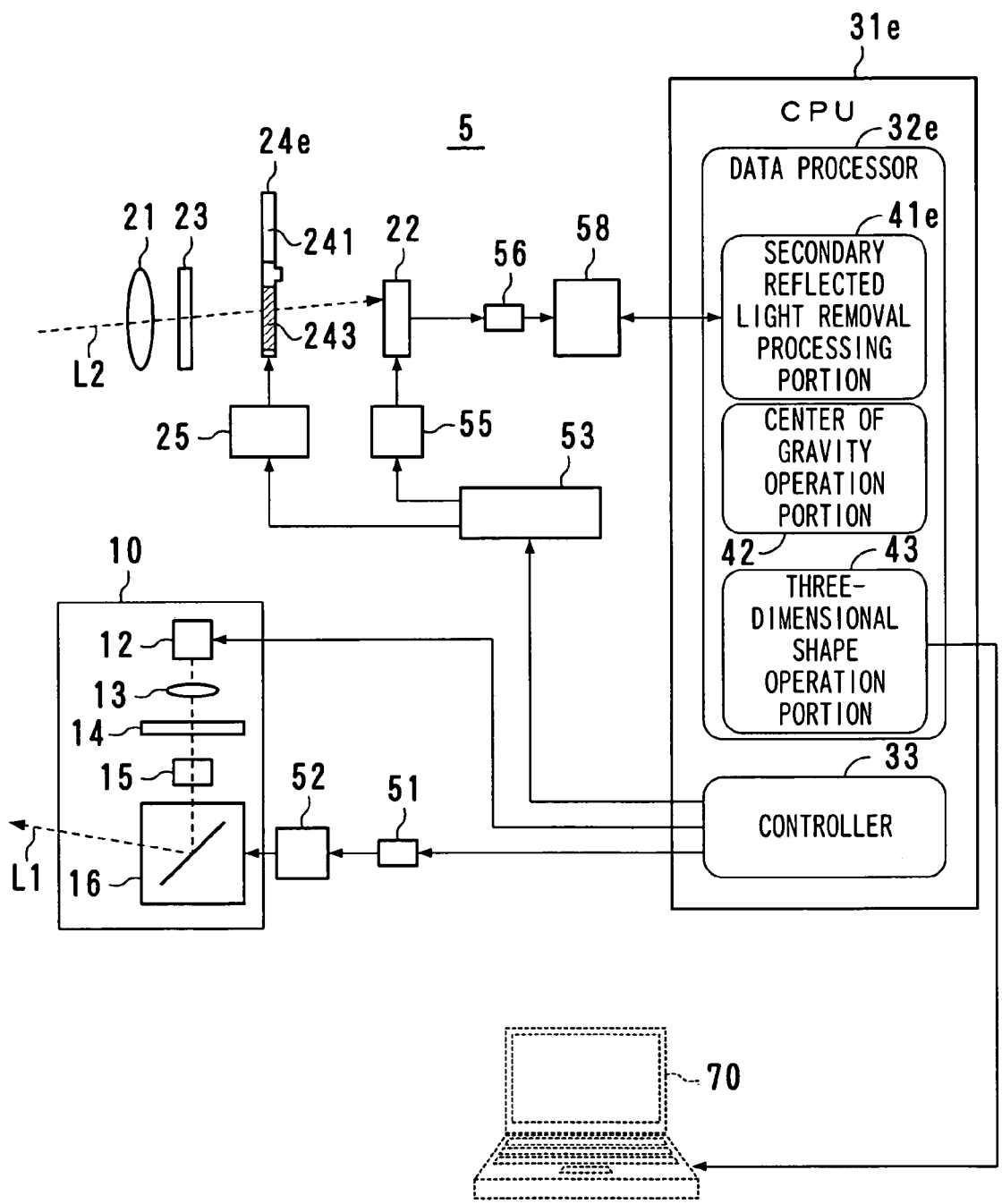
FIG. 14 is a diagram showing a configuration of a three-dimensional position measurement apparatus according to a fifth embodiment.

FIG. 14 is a diagram showing a configuration of a three-dimensional position measurement apparatus 5 according to the fifth embodiment. In FIG. 14, structural elements having the same functions as those in the example shown in FIG. 1 are given the same reference numerals/symbols as the structural elements in FIG. 1. Hereinafter, descriptions of the structural elements are omitted or simplified in order to avoid duplication of description.

The three-dimensional position measurement apparatus 5 includes a rotating filter 24e for obtaining two kinds of signals. When the fifth embodiment is compared with the first embodiment, the main difference therebetween is that the rotating filter 24e is included instead of the rotating filter 24.

The rotating filter 24e has a rotator for supporting the glass plate 241 and the polarizing plate 243. The rotating filter 24e interposes the glass plate 241 or the polarizing plate 243 in the optical path between the quarter wavelength plate 23 and the area sensor 22.

The reflected light L2 passes through the light-receiving lens 21, the quarter wavelength plate 23 and the rotating filter 24e in this order and then to enter the area sensor 22. The A/D converter 56 converts the output from the area sensor 22 into digital received light data having a predetermined bit. The received light data are temporarily stored in the memory 58 and are loaded into a CPU 31e.

The CPU 31e includes a function of a data processor 32e. The data processor 32e includes a secondary reflected light removal processing portion 41e, the center of gravity operation portion 42 and the three-dimensional shape operation portion 43.

The three-dimensional position measurement apparatus 5 including the structural elements described above optically scans an object to be measured twice.

In either one of the two times, e.g., the first optical scan, the glass plate 241 is placed in the optical path between the quarter wavelength plate 23 and the area sensor 22. In this time optical scan, the primary reflected light L21 and the secondary reflected light L22 pass through the glass plate 241 in the substantially same manner to enter the area sensor 22. In this optical scan, a photoelectric conversion signal sensed by the area sensor 22 is obtained as a first signal. The first signal is received light information in the case where neither the primary reflected light L21 nor the secondary reflected light L22 is attenuated.

In the other optical scan, e.g., the second optical scan, the polarizing plate 243 is placed in the optical path between the quarter wavelength plate 23 and the area sensor 22. The rotating filter 24e is provided, in advance, with the polarizing plate 243 that selects the polarization direction so as to transmit the secondary reflected light L22 and to block the primary reflected light L21 when the polarizing plate 243 is placed in the optical path. However, the polarizing plate 243 cannot completely block the primary reflected light L21. In this optical scan, the secondary reflected light L22 that has passed through the polarizing plate 243 and the primary reflected light L21 attenuated thereby are incident on the area sensor 22. In this optical scan, a photoelectric conversion signal sensed by the area sensor 22 is obtained as a second signal. The second signal is received light information in the case where the primary reflected light L21 is selectively attenuated.

FIGS. 15A and 15B show the principles of signal processing according to the fifth embodiment.

Received light data are plotted with elapsed time during scanning (the case of temporal center of gravity operation) or light-receiving pixel position (the case of spatial center of gravity operation) being defined as the horizontal axis and intensity of received light signal being defined as the vertical axis, so that the graph shown in FIG. 15A is obtained. In FIG. 15A, a solid line curve shows a signal when the polarizing plate 243 is not placed in the optical path (the first signal described above), while a broken line curve shows a signal when the polarizing plate 243 is placed in the optical path and the primary reflected light L21 is attenuated (the second signal described above). Referring to FIGS. 15A and 15B, signals are shown by curves for the sake of convenience. Received light data practically obtained, however, are discrete data that are sampled for each frame period of image capturing with the area sensor 22 or for each pixel position on a light-receiving surface.

Referring to FIG. 15A, each of the first signal and the second signal has two peaks. When there are no differences in positional relationship with the object between the two times of scanning, peak positions in the horizontal axis are substantially the same between the two signals. In each of the signals, one of the two peaks corresponds to the primary reflected light L21 and the other corresponds to the secondary reflected light L22.

With the first signal (indicated by the solid line), there is not much difference between the peak level (signal value) shown on the left side of the drawing and the peak level shown on the right side thereof. In contrast, with the second signal (indicated by the broken line), the peak level shown on the left side is significantly lower than that shown on the right side. However, without mentioning only the first signal, as far as only the second signal is seen, it is not clear which of the two peaks corresponds to the primary reflected light L21. The reason for that is the same as in the case of the first embodiment.

When the first signal is compared with the second signal, in the illustrated example, a value of a level difference s4 between the peak of the first signal and the peak of the second signal shown on the right side is smaller than a value of a level difference s3 therebetween shown on the left side. The smaller value of the level difference means that reflected light is not attenuated by the polarizing plate 243, which proves that the peak shown on the right side corresponds to the secondary reflected light L22.

In this way, a portion corresponding to the primary reflected light L21 (primary reflected light components) is distinguished from a portion corresponding to the secondary reflected light L22 (secondary reflected light components) in each of the signals. Then, the secondary reflected light components are removed from the first signal or the second signal, which enables generation of a third signal that is received light information only for the primary reflected light, as shown in FIG. 15B.

The signal processing for removing the secondary reflected light components includes processing of extracting from the first signal a signal value in which the absolute value of the difference from the second signal is larger than a set threshold value, and processing of extracting from the second signal a signal value in which the absolute value of the difference from the first signal is larger than a set threshold value. Note that, compared to the latter processing, the former processing makes it possible to obtain a signal having a wider dynamic range.

Figure 16:
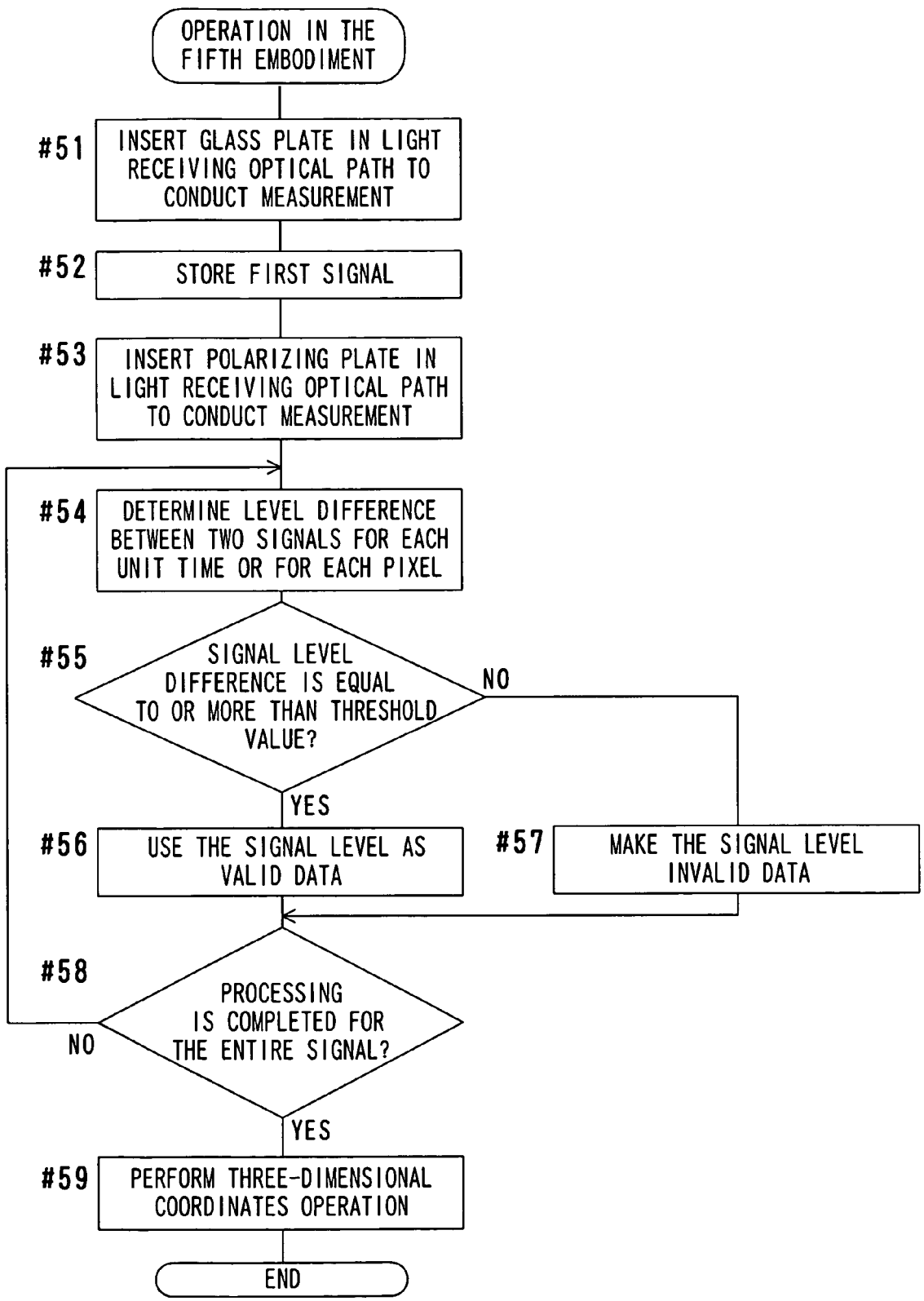
FIG. 16 is a flowchart showing the operation of the three-dimensional position measurement apparatus according to the fifth embodiment.

FIG. 16 is a flowchart showing the operation of the three-dimensional position measurement apparatus 5 according to the fifth embodiment.

In order to obtain the first signal, the glass plate 241 is interposed in a light receiving optical path to perform first scan (#51). On this occasion, the first signal thus obtained is stored in the memory 58 (#52). Subsequently, in order to obtain the second signal, the polarizing plate 243 is interposed in the light receiving optical path to perform second scan (#53).

The three-dimensional position measurement apparatus 5 incorporates the first signal and the second signal into the secondary reflected light removal processing portion 41e of the data processor 32e to perform signal processing for obtaining a third signal. More specifically, first, the fist signal is compared with the second signal for each unit time, e.g., each frame period, or for each pixel on a light-receiving surface to determine the level difference between the signals (#54). When the absolute value of the level difference is equal to or more than the set threshold value, the compared level is determined to be valid (#55 and #56). When the absolute value of the level difference is not equal to or more than the set threshold value, the compared level is determined to be invalid (#55 and #57). The calculation of the level difference and the comparison with the threshold value are performed for the entire first signal and second signal (#58). A group of the levels determined to be valid is the third signal.

Then, the third signal is introduced into the center of gravity operation portion 42 for calculating a temporal center of gravity or a spatial center of gravity. The calculation result is introduced into the three-dimensional shape operation portion 43 to perform a coordinates operation based on the principles of the triangulation method (#59).

In the fifth embodiment described above, when the first signal is obtained that attenuates neither the primary reflected light nor the secondary reflected light, it is unnecessary to interpose the quarter wavelength plate 23 in the optical path. In other words, it is preferable to interpose the quarter wavelength plate 23 in the optical path only when the second signal is obtained. Accordingly, it is possible to attach the quarter wavelength plate 23 to the rotating filter 24e so as to be placed on the front side of the polarizing plate 243, instead of fixedly placing the quarter wavelength plate 23 on the front side of the rotating filter 24e. Alternatively, it is possible to attach the quarter wavelength plate 23 to a moving mechanism cooperating with the rotating filter 24e so that the polarizing plate 243 and the quarter wavelength plate 23 may be interposed in the optical path or may be displaced therefrom.

Sixth Embodiment

With the sixth embodiment, an optical device for splitting reflected light and two photoelectric detectors are used and thereby a first signal and a second signal to be compared with each other are obtained by a single scan at the same time in order to generate a signal where secondary reflected light components are removed.

Figure 17:
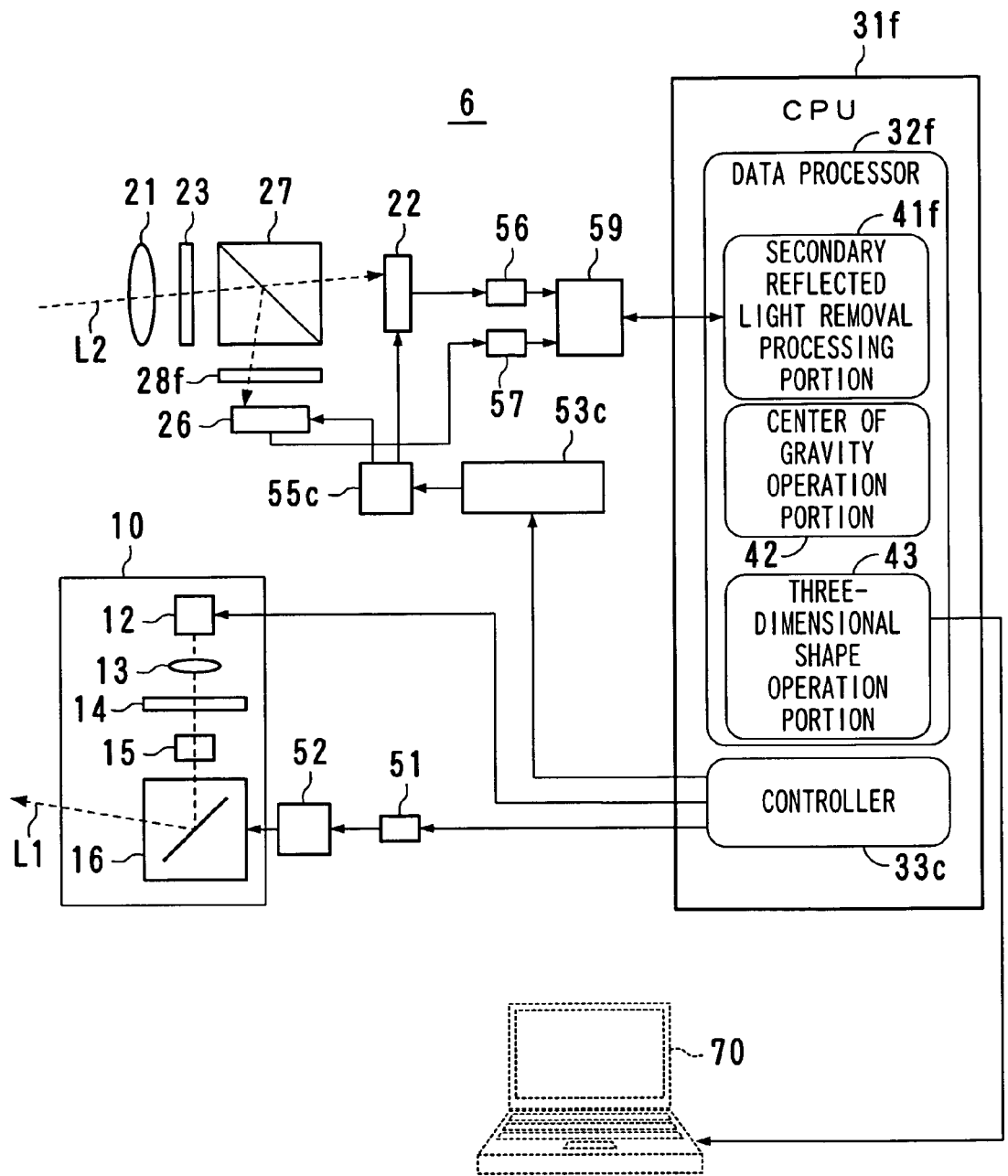
FIG. 17 is a diagram showing a configuration of a three-dimensional position measurement apparatus according to a sixth embodiment.

FIG. 17 is a diagram showing a configuration of a three-dimensional position measurement apparatus 6 according to the sixth embodiment. In FIG. 17, structural elements having the same functions as those in the example shown in FIG. 1 are given the same reference numerals/symbols as the structural elements in FIG. 1. Hereinafter, descriptions of the structural elements are omitted or simplified in order to avoid duplication of description.

The three-dimensional position measurement apparatus 6 includes, as elements for obtaining two kinds of signals, the beam splitting prism 27, the area sensor 26 functioning as a second light detector and a polarizing plate 28f. The main difference between the sixth embodiment and the first embodiment is that these structural elements are included instead of the rotating filter 24. The main difference between the sixth embodiment and the third embodiment is that the polarizing plate 28f is included instead of the polarizing plate 28.

The beam splitting prism 27 is placed between the quarter wavelength plate 23 and the area sensor 22. The beam splitting prism 27 splits the reflected light L2 that has passed through the quarter wavelength plate 23 into first split reflected light and second split reflected light, both of which have substantially the same amount of light. The beam splitting prism 27 is so positioned that the first split reflected light is incident on the area sensor 22. Note that the first split reflected light may be light to be passed through the beam splitting prism 27 or light to be reflected inside the beam splitting prism 27.

The area sensor 26 is placed at a position on which the second split reflected light emitted from the beam splitting prism 27 is incident.

The polarizing plate 28f is placed between the beam splitting prism 27 and the area sensor 26 so that the polarization direction is selected so as to transmit secondary reflected light included in the second split reflected light and to block primary reflected light included therein.

In the three-dimensional position measurement apparatus 6, the output from the area sensor 22 and the output from the area sensor 26 are introduced into a CPU 31f as a first signal and a second signal, respectively.

The CPU 31f functions as a data processor 32f and the controller 33c. The data processor 32f includes a secondary reflected light removal processing portion 41f, the center of gravity operation portion 42 and the three-dimensional shape operation portion 43.

In the sixth embodiment, signal processing is performed that is the same as in the case of the fifth embodiment based on the principles shown in FIG. 15. Thereby, it is possible to generate a third signal that is obtained by removing the secondary reflected light components from the first signal and the second signal.

Figure 18:
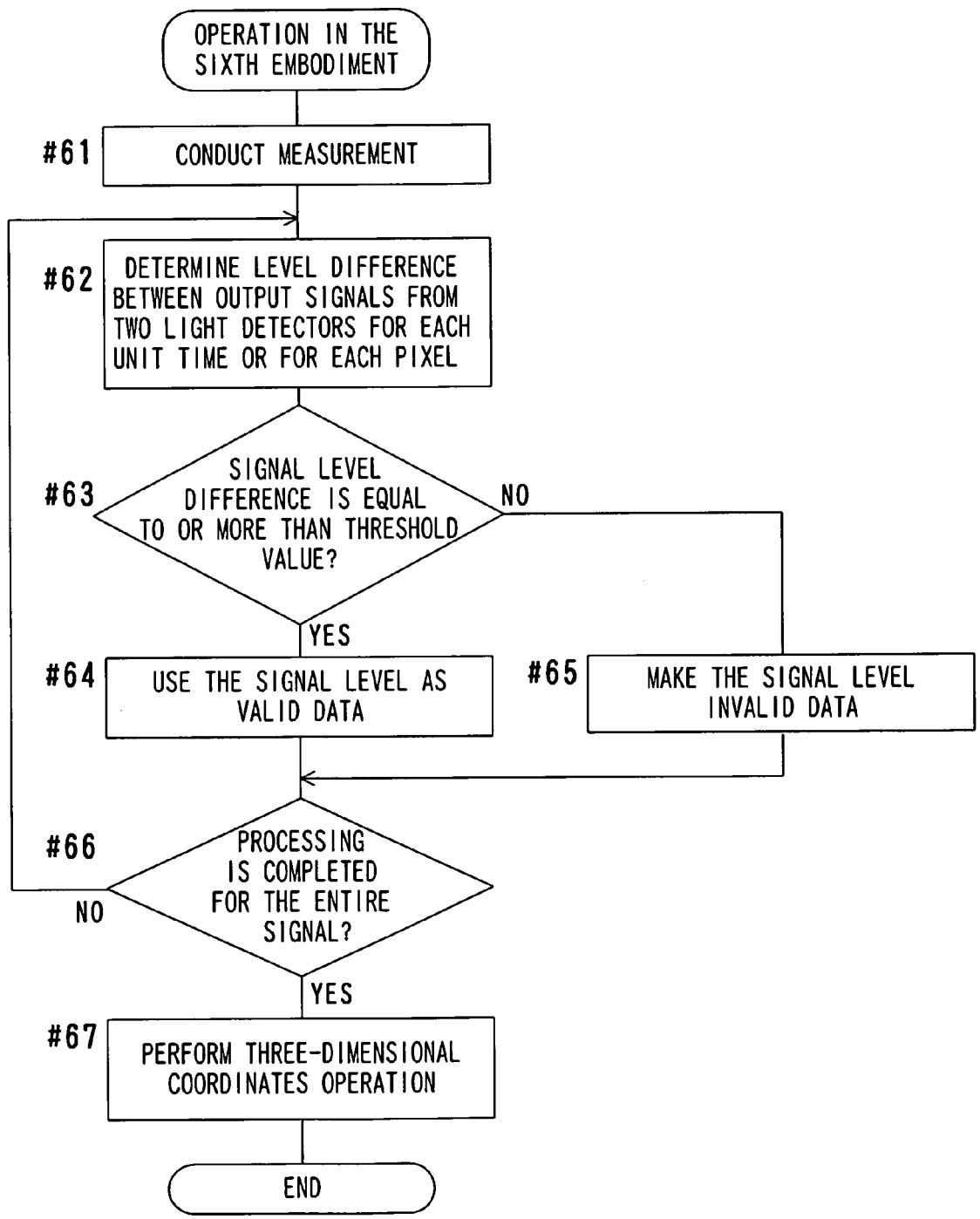
FIG. 18 is a flowchart showing the operation of the three-dimensional position measurement apparatus according to the sixth embodiment.

FIG. 18 is a flowchart showing the operation of the three-dimensional position measurement apparatus 6 according to the sixth embodiment.

In order to obtain the first signal and the second signal, an object to be measured is scanned (#61).

The three-dimensional position measurement apparatus 6 incorporates the first signal and the second signal into the secondary reflected light removal processing portion 41f of the data processor 32f to perform signal processing for obtaining a third signal. More specifically, first, the fist signal is compared with the second signal for each unit time, e.g., each frame period, or for each pixel on a light-receiving surface to determine the level difference between the signals (#62). When the absolute value of the level difference is equal to or more than the set threshold value, the compared level is determined to be valid (#63 and #64). When the absolute value of the level difference is not equal to or more than the set threshold value, the compared level is determined to be invalid (#63 and #65). The calculation of the level difference and the comparison with the threshold value are performed for the entire first signal and second signal (#66). A group of the levels determined to be valid is the third signal.

Then, the third signal is introduced into the center of gravity operation portion 42 for calculating a temporal center of gravity or a spatial center of gravity. The calculation result is introduced into the three-dimensional shape operation portion 43 to perform a coordinates operation based on the principles of the triangulation method (#67).

In the sixth embodiment described above, when the first signal is obtained that attenuates neither the primary reflected light nor the secondary reflected light, it is unnecessary to interpose the quarter wavelength plate 23 in the optical path. In other words, it is preferable to interpose the quarter wavelength plate 23 in the optical path only when the second signal is obtained. Accordingly, it is possible to place the quarter wavelength plate 23 between the beam splitting prism 27 and the polarizing plate 28f, instead of placing the quarter wavelength plate 23 on the front side of the beam splitting prism 27.

According to the first through sixth embodiments described above, it is unnecessary to project plural beams, which eliminates the need for using a complicated light-projecting portion. According to the third, fourth and sixth embodiments, a signal where secondary reflected light components are removed can be obtained by a single scan. Consequently, the time required for measurement can be shortened compared to the cases of the first, second and fifth embodiments where scan operation is necessary twice.

In the first through sixth embodiments described above, the measurement light L1 is circular polarized light. Instead, however, the polarization state thereof may be elliptical polarized light. As the polarization state of the measurement light L1 is closer to circular polarized light, the blocking rate is larger when a polarizing device blocks primary reflected light or secondary reflected light that has passed through the quarter wavelength plate 23 on the receiving side. Even in the case of elliptical polarized light, the primary reflected light or the secondary reflected light can be selectively attenuated by adjusting at least one of the rotation direction of an optical axis of the quarter wavelength plate 23 on the receiving side and the rotation direction of the polarizing device.

In the first through sixth embodiments, the configuration of the entire or a part of the three-dimensional position measurement apparatuses 1-6, the signal processing contents and the like can be modified if necessary. For example, instead of the rotating filter 24 in the first embodiment, a movable filter mechanism for translating the glass plate 241 and the polarizing plate 242 can be adopted. The same applies to the rotating filters 24b and 24e in the second and fifth embodiments. Further, in the first, second and fifth embodiments, scanning operation for obtaining the first signal may be performed first or scanning operation for obtaining the second signal may be performed first.

According to the above described structures, in addition to primary reflected light, secondary reflected light is also received. Further, even when intensity of the received secondary reflected light is higher than that of the received primary reflected light, proper measurement can be performed. Consequently, the present invention is useful to expand the applications of the three-dimensional position measurement apparatus.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A three-dimensional position measurement method for specifying a position of a part irradiated with measurement light of an object to be measured, based on a projection angle of the measurement light projected onto the object and an acceptance angle of the measurement light reflected from the object, the method comprising:

projecting, as the measurement light, circular polarized light or elliptical polarized light onto the object;

photoelectrically converting a first portion of reflected light from the object to obtain a first signal;

allowing a second portion of the reflected light from the object to enter a quarter wavelength plate;

allowing reflected light that has passed through the quarter wavelength plate to enter a polarizing device attenuating secondary reflected light that is light reflected from the object twice;

photoelectrically converting reflected light that has passed through the polarizing device to obtain a second signal;

performing signal processing, for the first signal or the second signal, of removing secondary reflected light components by using a difference between the first signal and the second signal; and determining a set of the projection angle and the acceptance angle based on a third signal obtained by the signal processing.

2. The three-dimensional position measurement method according to claim 1, wherein the signal processing is processing of extracting from the first signal a signal value in which an absolute value of a difference from the second signal is smaller than a set value or processing of extracting from the second signal a signal value in which an absolute value of a difference from the first signal is smaller than a set value.

3. A three-dimensional position measurement method for specifying a position of a part irradiated with measurement light of an object to be measured, based on a projection angle of the measurement light projected onto the object and an acceptance angle of the measurement light reflected from the object, the method comprising:

projecting, as the measurement light, circular polarized light or elliptical polarized light onto the object;

photoelectrically converting a first portion of reflected light from the object to obtain a first signal;

allowing a second portion of the reflected light from the object to enter a quarter wavelength plate;

allowing reflected light that has passed through the quarter wavelength plate to enter a polarizing device attenuating primary reflected light that is light reflected from the object once;

photoelectrically converting reflected light that has passed through the polarizing device to obtain a second signal;

performing signal processing, for the first signal or the second signal, of removing secondary reflected light components by using a difference between the first signal and the second signal; and determining a set of the projection angle and the acceptance angle based on a third signal obtained by the signal processing.

4. The three-dimensional position measurement method according to claim 3, wherein the signal processing is processing of extracting from the first signal a signal value in which an absolute value of a difference from the second signal is larger than a set value or processing of extracting from the second signal a signal value in which an absolute value of a difference from the first signal is larger than a set value.

5. A three-dimensional position measurement method for specifying a position of a part irradiated with measurement light of an object to be measured, based on a projection angle of the measurement light projected onto the object and an acceptance angle of the measurement light reflected from the object, the method comprising:

projecting, as the measurement light, circular polarized light or elliptical polarized light onto the object;

allowing reflected light from the object to enter a quarter wavelength plate;

allowing reflected light that has passed through the quarter wavelength plate to enter a first optical path having a polarization function of attenuating primary reflected light that is light reflected from the object once;

photoelectrically converting reflected light that has passed through the first optical path to obtain a first signal;

allowing the reflected light that has passed through the quarter wavelength plate to enter a second optical path having a polarization function of attenuating secondary reflected light that is light reflected from the object twice;

photoelectrically converting reflected light that has passed through the second optical path to obtain a second signal;

performing signal processing, for the first signal or the second signal, of removing secondary reflected light components by using a difference between the first signal and the second signal; and determining a set of the projection angle and the acceptance angle based on a third signal obtained by the signal processing.

6. The three-dimensional position measurement method according to claim 5, wherein the signal processing is processing of extracting from the second signal a signal value in which a difference from the first signal is larger than a set value.

7. An apparatus for use in three-dimensional position measurement in which measurement light is projected onto an object to be measured and the measurement light reflected from the object is received, the apparatus comprising:

a projector for projecting, as the measurement light, circular polarized light or elliptical polarized light onto the object;

a separator for separating reflected light from the object into first split reflected light and second split reflected light;

a quarter wavelength plate placed on a front side or a rear side of the separator;

a first light detector for photoelectrically converting the first split reflected light;

a polarizing device on which the second split reflected light is incident, for attenuating secondary reflected light that is light reflected from the object twice, the secondary reflected light being included in the second split reflected light;

a second light detector for photoelectrically converting reflected light that has passed through the polarizing device; and a signal processor for performing signal processing, for a first signal or a second signal, of removing secondary reflected light components by using a difference between the first signal and the second signal, the first signal being obtained by the first light detector and the second signal being obtained by the second light detector.

8. An apparatus for use in three-dimensional position measurement in which measurement light is projected onto an object to be measured and the measurement light reflected from the object is received, the apparatus comprising:

a projector for projecting, as the measurement light, circular polarized light or elliptical polarized light onto the object;

a quarter wavelength plate on which reflected light from the object is incident;

a light detector for photoelectrically converting the reflected light from the object or reflected light that has passed through the quarter wavelength plate;

a movable filter mechanism for inserting or displacing a polarizing plate attenuating secondary reflected light that is light reflected from the object twice or the polarizing plate as well as the quarter wavelength plate into/from an optical path on a front side of the light detector;

a memory for storing at least a first signal or a second signal, the first signal being obtained by the light detector when the polarizing plate is not inserted in the optical path and the second signal being obtained by the light detector when the polarizing plate is inserted in the optical path; and a signal processor for performing signal processing, for the first signal or the second signal, at least one of which is stored in the memory, of comparing the first signal and the second signal to remove secondary reflected light components by using a difference between the first signal and the second signal.

9. An apparatus for use in three-dimensional position measurement in which measurement light is projected onto an object to be measured and the measurement light reflected from the object is received, the apparatus comprising:
- a projector for projecting, as the measurement light, circular polarized light or elliptical polarized light onto the object;
- a quarter wavelength plate on which reflected light from the object is incident;
- a polarized light beam splitter for separating reflected light that has passed through the quarter wavelength plate into first split reflected light where primary reflected light that is light reflected from the object once is attenuated and second split reflected light where secondary reflected light that is light reflected from the object twice is attenuated;
- a first light detector for photoelectrically converting the first split reflected light;
- a second light detector for photoelectrically converting the second split reflected light; and
- a signal processor for performing signal processing, for a first signal or a second signal, of removing secondary reflected light components by using a difference between the first signal and the second signal, the first signal being obtained by the first light detector and the second signal being obtained by the second light detector.

10. An apparatus for use in three-dimensional position measurement in which measurement light is projected onto an object to be measured and the measurement light reflected from the object is received, the apparatus comprising:
- a projector for projecting, as the measurement light, circular polarized light or elliptical polarized light onto the object;
- a quarter wavelength plate on which reflected light from the object is incident;
- a light detector for photoelectrically converting reflected light that has passed through the quarter wavelength plate;
- a movable filter mechanism for inserting any one of a first polarizing plate attenuating primary reflected light that is light reflected from the object once and a second polarizing plate attenuating secondary reflected light that is light reflected from the object twice in an optical between the quarter wavelength plate and the light detector;
- a memory for storing at least a first signal or a second signal, the first signal being obtained by the light detector when the first polarizing plate is inserted in the optical path and the second signal being obtained by the light detector when the second polarizing plate is inserted in the optical path; and
- a signal processor for performing signal processing, for the first signal or the second signal, at least one of which is stored in the memory, of comparing the first signal and the second signal to remove secondary reflected light components by using a difference between the first signal and the second signal.

11. An apparatus for use in three-dimensional position measurement in which measurement light is projected onto an object to be measured and the measurement light reflected from the object is received, the apparatus comprising:
- a projector for projecting, as the measurement light, circular polarized light or elliptical polarized light onto the object;
- a separator for separating reflected light from the object into first split reflected light and second split reflected light;
- a quarter wavelength plate on a front side or a rear side of the separator;
- a first light detector for photoelectrically converting the first split reflected light;
- a polarizing device on which the second split reflected light is incident, for attenuating primary reflected light that is light reflected from the object once, the primary reflected light being included in the second split reflected light;
- a second light detector for photoelectrically converting reflected light that has passed through the polarizing device; and
- a signal processor for performing signal processing, for a first signal or a second signal, of removing secondary reflected light components by using a difference between the first signal and the second signal, the first signal being obtained by the first light detector and the second signal being obtained by the second light detector.

12. An apparatus for use in three-dimensional position measurement in which measurement light is projected onto an object to be measured and the measurement light reflected from the object is received, the apparatus comprising:
- a projector for projecting, as the measurement light, circular polarized light or elliptical polarized light onto the object;
- a quarter wavelength plate on which reflected light from the object is incident;
- a light detector for photoelectrically converting the reflected light from the object or reflected light that has passed through the quarter wavelength plate;
- a movable filter mechanism for inserting or displacing a polarizing plate attenuating primary reflected light that is light reflected from the object once or the polarizing plate as well as the quarter wavelength plate into/from an optical path on a front side of the light detector;
- a memory for storing at least a first signal or a second signal, the first signal being obtained by the light detector when the polarizing plate is not inserted in the optical path and the second signal being obtained by the light detector when the polarizing plate is inserted in the optical path; and
- a signal processor for performing signal processing, for the first signal or the second signal, at least one of which is stored in the memory, of comparing the first signal and the second signal to remove secondary reflected light components by using a difference between the first signal and the second signal.

13. The apparatus for use in the three-dimensional position measurement according to claim 7, wherein the projector includes a scanner for changing a projection angle of the measurement light and each of the first and second light detectors is a two-dimensional imaging device.

14. The apparatus for use in the three-dimensional position measurement according to claim 8, wherein the projector includes a scanner for changing a projection angle of the measurement light and the light detector is a two-dimensional imaging device.

* * * * *